United States Patent [19]

Nishioka et al.

[11] Patent Number: 4,674,844
[45] Date of Patent: Jun. 23, 1987

[54] OBJECTIVE LENS SYSTEM FOR AN ENDSCOPE

[75] Inventors: Kimihiko Nishioka; Susumu Takahashi; Akira Yokota; Minoru Okabe, all of Tokyo, Japan

[73] Assignee: Olympus Optical Co., Ltd., Tokyo, Japan

[21] Appl. No.: 758,417

[22] Filed: Jul. 24, 1985

[30] Foreign Application Priority Data

Jul. 28, 1984 [JP] Japan .................. 59-156513

[51] Int. Cl.$^4$ .......................... G02B 9/58; G02B 9/60; G02B 13/18
[52] U.S. Cl. .................. 350/469; 350/432; 350/450
[58] Field of Search .............. 350/432, 469, 465, 450

[56] References Cited

U.S. PATENT DOCUMENTS 2,781,695  2/1957  Klemt .................. 350/469
3,209,649  10/1965  Macher ................. 350/469
4,176,915  12/1979  Mori .................... 350/469

FOREIGN PATENT DOCUMENTS 3139884   5/1982  Fed. Rep. of Germany .
3214544  11/1982  Fed. Rep. of Germany .
42-23896 11/1967  Japan .
49-121547 11/1974 Japan .

Primary Examiner—John K. Corbin
Assistant Examiner—Rebecca D. Gass
Attorney, Agent, or Firm—Cushman, Darby & Cushman

[57] ABSTRACT

An objective lens system for an endoscope comprises a first lens component having a negative refracting power, a second lens component having a positive refracting power, a third lens component having a positive refracting power and a fourth lens component involving a meniscus lens having its concave surface facing the object side, with the lens system being such that the total length is short, the outside diameter is small, the angle of view is wide, and the illuminance in the peripheral portion of the image field is high.

28 Claims, 34 Drawing Figures

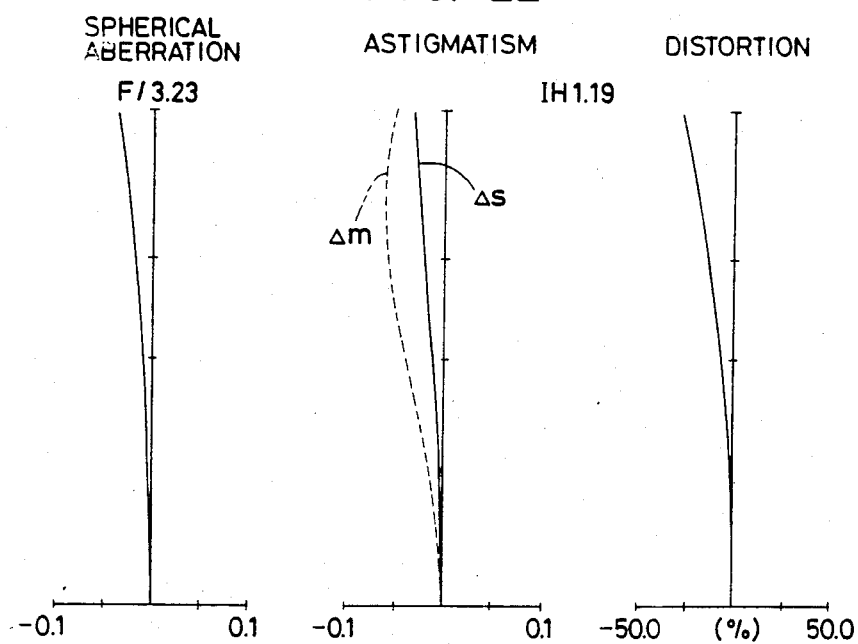
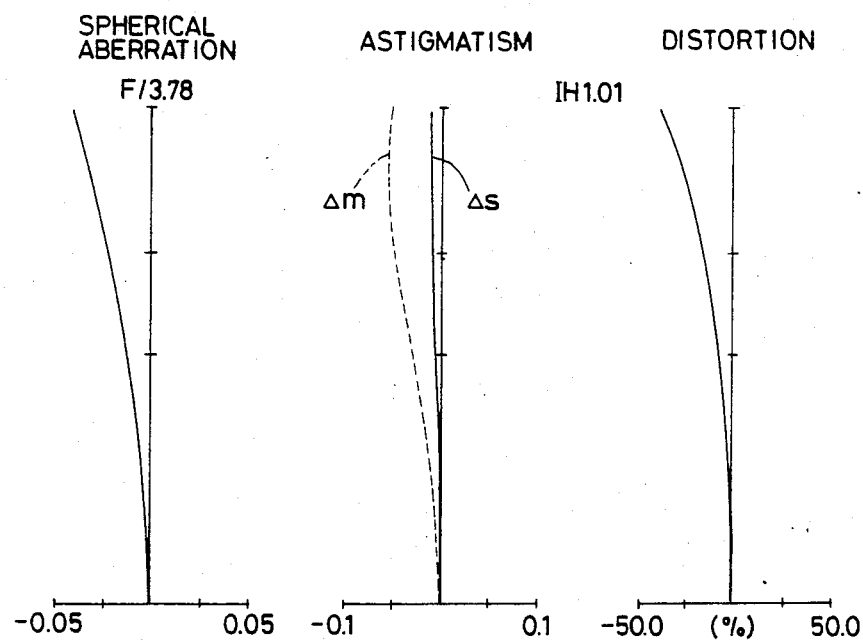

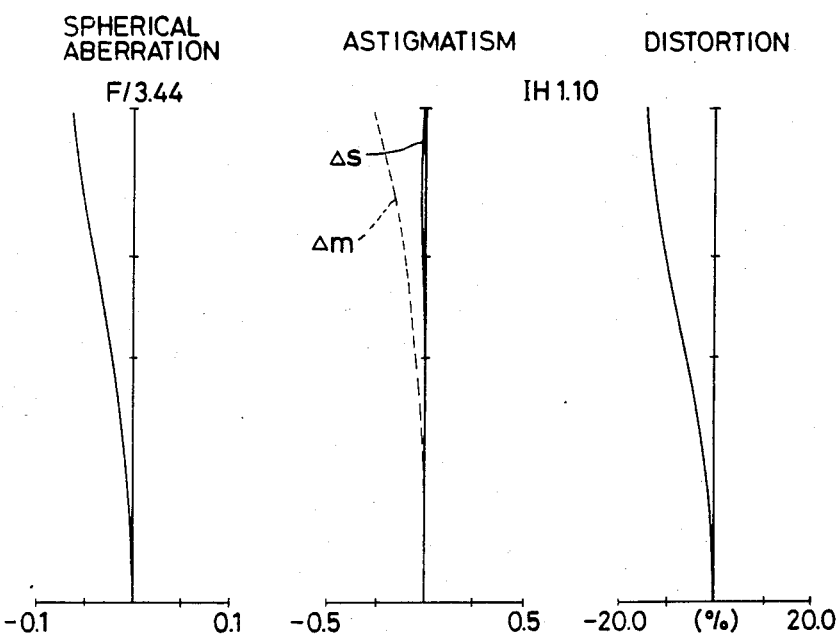
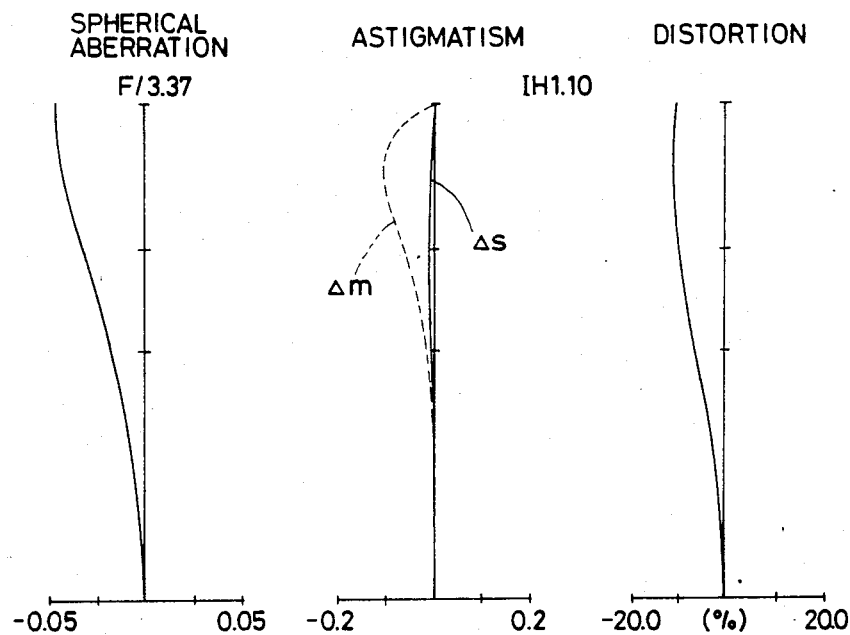

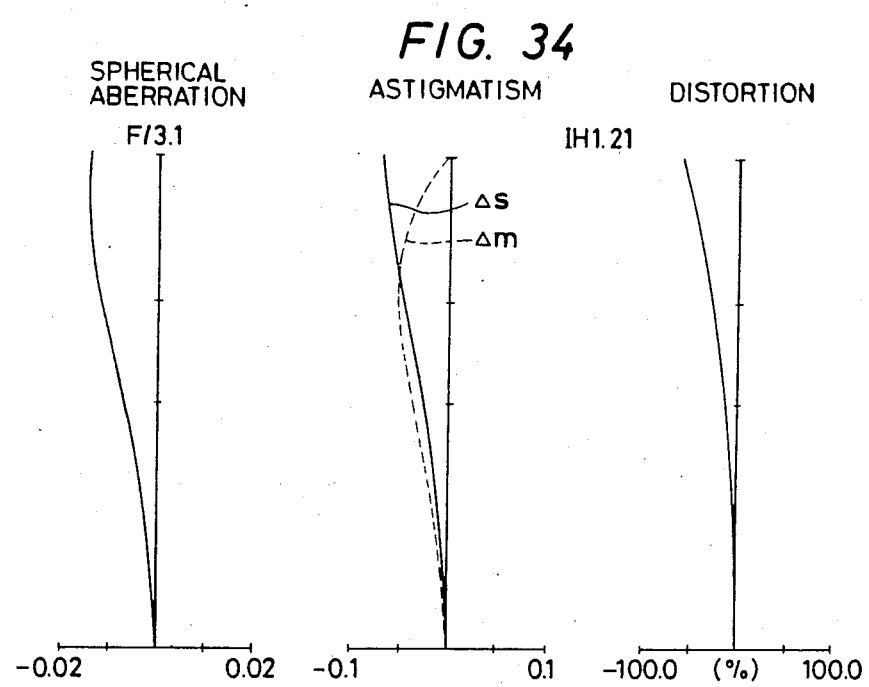

OBJECTIVE LENS SYSTEM FOR AN ENDSCOPE

BACKGROUND OF THE INVENTION (a) Field of the Invention

The present invention relates to an objective lens system for an endoscope.

(b) Description of the Prior Art

A retrofocus type lens system is known as an objective lens system for an endoscope which is, for example, disclosed in Japanese Published Unexamined Patent Application No. 121547/74, and illustrated in FIG. 1. This objective lens system was convenient for a principal ray 2 to incident vertically on an image guide 1. But, the objective lens system of this type had defects such that distortion was large, the total length was long, and the outside diameter of the objective lens system was large compared with the image height.

SUMMARY OF THE INVENTION

It is, therefore, a primary object of the present invention to provide an objective lens system for an endoscope of which the total length is short, the outside diameter is small, the angle of view is wide, and the illuminance in the peripheral portion of the image field is high.

FIG. 2 shows a sectional view of the basic lens configuration according to the present invention. As shown in this Figure, the objective lens system according to the present invention comprises a first lens component having a negative refracting power, a second lens component having a positive refracting power, a third lens component having a positive refracting power, a fourth lens component involving a single or cemented meniscus lens having its concave surface facing the object side, and satisfies the following conditions:

$$|h_1/f_1| > 1.15 |h_4/f_4| \quad (1)$$

where $h_1$ and $h_4$ represent the mean values of the heights of the principal ray at respective surfaces of the first lens component and the fourth lens component, $f_1$ and $f_4$ represent the focal lengths of the first lens component and the fourth lens component, respectively.

In the case of an endoscope having a solid-state image pick-up device as shown in FIG. 2 as an example, even when the principal ray 4 enters the solid-state image-pick up device 3 obliquely, there will be no such defects as are noted in the case when image fibers are used.

In the objective lens system for an endoscope according to the present invention, the fourth lens component involving a meniscus lens is arranged in front of the image surface and this enables to overcome the defects existed in the known retrofocus type objective lens system for an endoscope, such as a large distortion, a long total length (the total length means the length between the foremost lens surface of the objective lens system and the image surface) and a large diameter of the objective lens system.

In the objective lens system according to the present invention, when the aperture diaphragm is arranged between the outermost surface of the second lens component towards the object and the outermost surface of the third lens component towards the image, it is more desirable for the correction of distortion, etc. In other words, the above mentioned position of the aperture diaphragm will be shifted backwards from the position thereof in the original retrofocus type objective lens system for an endoscope of a telecentric system. The incident angle of the principal ray on the image surface can be made large in proportion to the shifting rate, which is advantageous for the correction of distortion.

When the aperture diaphragm is arranged at the above mentioned position, the second lens component having a positive power situates in front of the aperture diaphragm, which moderates the asymmetry of the retrofocus type lens system for an endoscope having the aperture diaphragm arranged between the divergent group and the convergent group (in this case, the divergent group comprises only the negative lens component and the convergent group comprises only the positive lens component) and, this is advantageous for the correction of coma aberration.

An optical system similar to the objective lens system according to the present invention is disclosed, for example, in Japanese Published Examined Patent Application No. 23896/67 and shown in FIG. 3. In that optical system, the refracting power $|h_4/f_4|$ of the principal ray by the fourth lens component is so strong that the wider the angle of view becomes the larger the incident angle of the principal ray on the image surface becomes and, therefore, the illuminance in the peripheral portion of the image field decreases considerably due to the $\cos^4$ law.

In view of this point, according to the present invention, the refracting power $|h_1/f_1|$ of the principal ray by the first lens component will be made stronger than the refracting power $|h_4/f_4|$ of the principal ray by the fourth lens component, the lens system will be made wide angle by the first lens component, the principal ray will be refracted moderately by the fourth lens component so that the distortion will be eliminated within the limits within which the illuminance in the peripheral portion of the image field dose not decrease much, the total length (the length between the first surface and the image surface) will be made short, and the outside diameter of the lens will be made small. For that purpose, it is necessary for the focal length $f_1$ of the first lens component and the focal length $f_4$ of the fourth lens component to satisfy the above mentioned condition (1). If this condition (1) is not satisfied, it will be impossible to correct distortion and the lens system will inevitably become large, which will be against the object of the present invention.

In the above mentioned known optical system (disclosed in Japanese Published Examined Patent Application No. 23896/67), the occurrence of spherical aberration is so extensive that the aperture ratio can not be made large.

Besides the condition (1), it is desirable to satisfy the following condition (2):

$$f_2 < 3.5f \quad (2)$$

where $f_2$ represents the focal length of the second lens component, $f$ represents the focal length of the objective lens system.

The condition (2) is established in order to shift a positive power of the lens system towards the front thereof, and to shift the position of the principal point of the entire lens system towards the object so as to shorten the total length thereof. That condition is also intended to correct coma aberration of the lowerside ray generated by the first lens component having a negative refracting power. If this condition (2) is not satisfied, a correction of coma aberration will be difficult.

Besides the conditions (1) and (2), it is more desirable to satisfy the following conditions (3) and (4):

$$|f_4| < 6f \quad (3)$$

$$-R_2 \leq 15f \quad (4)$$

where $R_2$ represents the radius of curvature of the image side surface of the second lens component.

The refracting power of the fourth lens component is made weak as set by the condition (1). But when $|f_4|$ becomes too large to satisfy the above mentioned condition (3), the effectiveness of the condition (1) will become weak, which is not desirable.

And, if the condition (4) is not satisfied, spherical aberration will become undercorrected.

In order to obtain the objective lens system meeting the object of the present invention, it is still more desirable to satisfy the following conditions (5) through (9):

$$|f_1| < 1.7f \quad (5)$$

$$|f_{23}| < 1.7f \quad (6)$$

$$R_2' > 0 \quad (7)$$

$$R_3 < 5f \quad (8)$$

$$|R_3'| < 3f \quad (9)$$

where $f_{23}$ represents the composite focal length of the second lens component and the third lens component, $R_2'$ represents the radius of curvature of the outermost surface of the second lens component towards the object, $R_3$ represents the radius of curvature of the outermost surface of the third lens component towards the object, $R_3'$ represents the radius of curvature of the cemented surface of the third lens component.

When the above mentioned conditions (5) and (6) are satisfied, the negative power of the first lens component and the positive powers of the second and third lens components will become comparatively strong, which will be desirable to shorten the total length of the lens system. Any deviation from either the condition (5) or (6), whichever the case may be, will not be desirable for shortening the total length.

When the power of each lens component is made strong satisfying the conditions (5) and (6), it will become difficult to correct various aberrations. In order to overcome such a difficulty it will be desirable that the condition (7) be satisfied.

The condition (7) is related to the radius of curvature of the foremost surface of the second lens component. When this radius of curvature is made postive, it will be possible to prevent the incident angle off-axial ray on that surface from becoming extremely large, and it will be possible to restrain the occurrence of astigmatic difference. If the condition (7) is not satisfied, astigmatic difference will become large.

When the radius $R_3$ of curvature of the outermost surface of the third lens component towards the object satisfies the condition (9) and the radius $R_3'$ of curvature of the cemented surface satisfies the condition (8), it will be possible to correct spherical aberration satisfactorily. If this conditions (8) and (9) is not satisfied, spherical aberration will become undercorrected.

As in Embodiments described hereinafter, it will be desirable for the correction of distortion to arrange that the lens involved in the first lens component or the fourth lens component be the lens having an aspherical surface the shape of which is the following. That is, the object side surface of the first lens component may be an aspherical surface which involves such a portion that the curvature of this portion becomes progressively stronger towards the edge of the surface, the image side surface of the first lens component may be an aspherical surface which involves such a portion that the curvature of this portion becomes progressively weaker towards the edge of the surface, the object side surface of the fourth lens component may be an aspherical surface which involves such a portion that the curvature of this portion becomes progressively weaker towards the edge of the surface (i.e., a portion that the abusolute value of the radius of curvature thereof becomes progressively smaller), or the image side surface of the fourth lens component may be an aspherical surface which involves such a portion that the curvature of this portion becomes progressively stronger towards the edge of the surface (i.e., a portion that the absolute value of the radius of curvature thereof becomes progressively larger). The strength of curvature also takes into account the sign thereof. In other words, if the center of curvature of a spherical surface which is tangential to an aspherical surface at the vertex thereof is positioned at the object side, the smaller the radius of curvature thereof becomes the weaker the curvature thereof to be defined becomes, and if the center of curvature of a spherical surface which is tangential to an aspherical surface at the vertex thereof is positioned at the image side, the smaller the radius of curvature thereof becomes the stronger the curvature thereof to be defined becomes. In short, it is desirable for the first lens component to have such an aspherical lens that the refraction of the principal ray by an aspherical surface becomes progressively weaker towards the edge compared with the refraction by a spherical surface, and it is desirable for the fourth lens component to have such an aspherical lens that the refraction of the principal ray by an aspherical surface becomes progressively stronger towards the edge compared with the refraction by a spherical surface. The aforementioned fact is also applicable to the case where a cemented surface is an aspherical one. The shapes of these aspherical surfaces may presumably be expressed by the following formula wherein the coordinates are set as shown in FIG. 4.

$$x = Ey^4 + Fy^6$$

where E represents the coefficient of an aspherical surface.

BRIEF DESCRIPTION OF THE DRAWINGS

FIGS. 20 through 34 respectively show graphs illustrating aberration curves of Embodiments 1 through 15 according to the present invention.

DETAILED DESCRIPTION OF THE PREFERRED EMBODIMENTS

Figure 1:
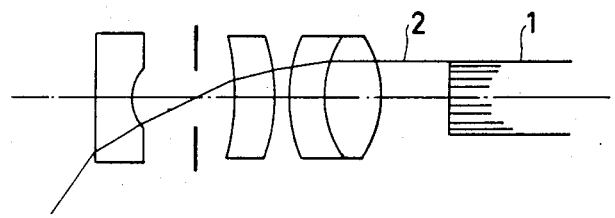
FIG. 1 shows a sectional view of the configuration of a known objective lens system for an endoscope.
Figure 2:
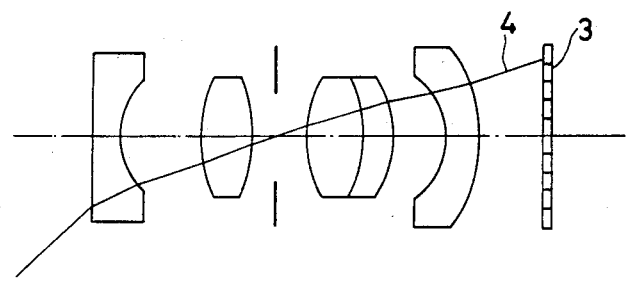
FIG. 2 shows a sectional view of the basic configuration of an objective lens system for an endoscope according to the present invention.
Figure 3:
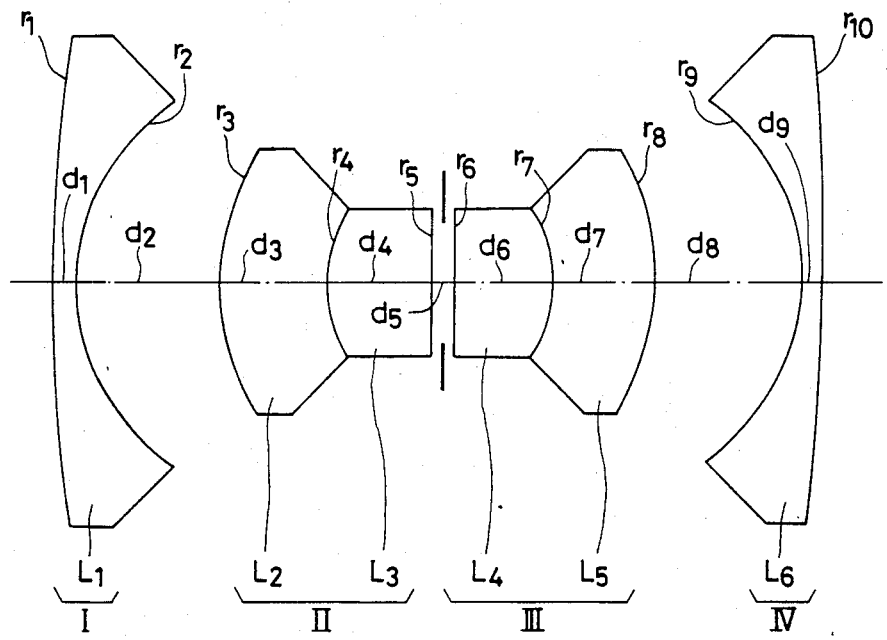
FIG. 3 shows a sectional view of the configuration of another known lens system.
Figure 4:
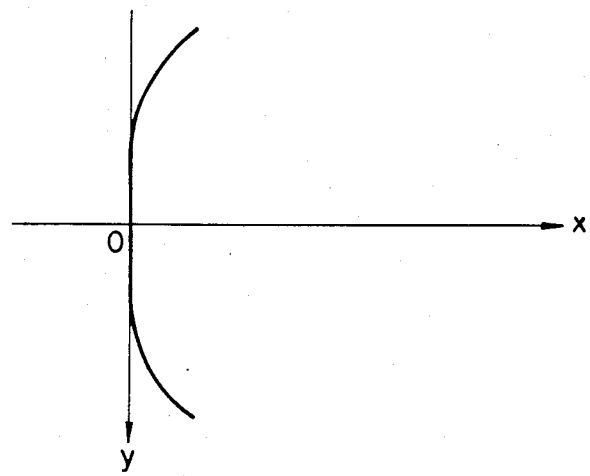
FIG. 4 shows a diagrammatic view illustrating the shape of an aspherical surface used in embodiments according to the present invention.

Now, preferred embodiments of the objective lens system for an endoscope according to the present invention are shown below:

---

Embodiment 1
f = 1.00   F/3.78   image height 1.0040
angle of view 115°

$r_1 = \infty$
$d_1 = 0.2520$     $n_1 = 1.51633$     $v_1 = 64.15$
$r_2 = 0.6655$
$d_2 = 1.2601$
$r_3 = 2.2444$
$d_3 = 0.2520$     $n_2 = 1.74100$     $v_2 = 52.68$
$r_4 = -6.8676$
$d_4 = 0.0504$
$r_5 = \infty$ (aperture diaphragm)
$d_5 = 0.0504$
$r_6 = 2.5764$
$d_6 = 0.5544$     $n_3 = 1.62041$     $v_3 = 60.27$
$r_7 = -0.5040$
$d_7 = 0.2016$     $n_4 = 1.80518$     $v_4 = 25.43$
$r_8 = -0.9738$
$d_8 = 0.7436$
$r_9 = -0.6990$
$d_9 = 0.2520$     $n_5 = 1.72825$     $v_5 = 28.46$
$r_{10} = -1.2601$
$h_1/f_1 = 0.541$   $h_4/f_4 = 0.184$
$(h_1/f_1)/(h_4/f_4) = 2.94$
$f_1 = -1.29$      $f_2 = 2.31$       $f_{23} = 1.08$
$f_4 = -2.66$      $R_2 = -6.8676$    $R_2' = 2.2444$
$R_3 = 2.5764$     $R_3' = -0.9738$

---

Embodiment 2
f = 1.00   F/3.14   image height 1.2102
angle of view 115°

$r_1 = 3.1235$
$d_1 = 0.3038$     $n_1 = 1.65160$     $v_1 = 58.52$
$r_2 = 0.7758$
$d_2 = 1.5519$
$r_3 = 1.7854$
$d_3 = 0.3038$     $n_2 = 1.74100$     $v_2 = 52.68$
$r_4 = -10.6273$
$d_4 = 0.0608$
$r_5 = \infty$ (aperture diaphragm)
$d_5 = 0.0608$
$r_6 = 1.5013$
$d_6 = 0.6683$     $n_3 = 1.62041$     $v_3 = 60.27$
$r_7 = -0.6075$
$d_7 = 0.2430$     $n_4 = 1.80518$     $v_4 = 25.43$
$r_8 = -1.2264$
$d_8 = 0.4860$
$r_9 = -0.6198$
$d_9 = 0.3038$     $n_5 = 1.72825$     $v_5 = 28.46$
$r_{10} = -1.8226$
$h_1/f_1 = 0.558$   $h_4/f_4 = 0.388$
$(h_1/f_1)/(h_4/f_4) = 1.44$
$f_1 = -1.67$      $f_2 = 2.0846$     $f_{23} = 1.04$
$f_4 = -1.44$      $R_2 = -10.6273$   $R_2' = 1.7854$
$R_3 = 1.5013$     $R_3' = -0.6075$

---

Embodiment 3
f = 1.00   F/3.228   image height 1.1914
angle of view 114°

$r_1 = 2.3923$
$d_1 = 0.2990$     $n_1 = 1.51633$     $v_1 = 64.15$
$r_2 = 0.5981$
$d_2 = 1.0830$
$r_3 = 2.5608$
$d_3 = 0.2990$     $n_2 = 1.74100$     $v_2 = 52.68$
$r_4 = \infty$ (aperture diaphragm)
$d_4 = 0.2990$     $n_3 = 1.74100$     $v_3 = 52.68$
$r_5 = -1.6972$
$d_5 = 0.0598$
$r_6 = 2.4832$
$d_6 = 0.2392$     $n_4 = 1.71736$     $v_4 = 29.51$
$r_7 = 1.0766$
$d_7 = 1.0391$     $n_5 = 1.71300$     $v_5 = 53.84$
$r_8 = -2.0701$
$d_8 = 0.3069$
$r_9 = -0.7419$
$d_9 = 0.2990$     $n_5 = 1.72825$     $v_5 = 28.46$
$r_{10} = -2.4014$
$h_1/f_1 = 0.479$   $h_4/f_4 = 0.411$
$(h_1/f_1)/(h_4/f_4) = 1.165$
$f_1 = -1.64$      $f_2 = 1.465$      $f_{23} = 1.02$
$f_4 = -1.60$      $R_2 = -1.6972$    $R_2' = 2.5608$
$R_3 = 2.4832$     $R_3' = 1.0766$

---

Embodiment 4
f = 1.00   F/3.781   image height 1.0091
angle of view 115°

$r_1 = \infty$
$d_1 = 0.2533$     $n_1 = 1.51633$     $v_1 = 64.15$
$r_2 = 0.6947$
$d_2 = 1.2665$
$r_3 = 1.1738$
$d_3 = 0.2533$     $n_2 = 1.74100$     $v_2 = 52.68$
$r_4 = -9.5318$
$d_4 = 0.0507$
$r_5 = \infty$ (aperture diaphragm)
$d_5 = 0.0507$
$r_6 = 1.7243$
$d_6 = 0.5572$     $n_3 = 1.51633$     $v_3 = 64.15$
$r_7 = -0.5220$
$d_7 = 0.2026$     $n_4 = 1.80518$     $v_4 = 25.43$
$r_8 = -0.9198$
$d_8 = 0.4008$
$r_9 = -0.5470$
$d_9 = 0.2026$     $n_5 = 1.59270$     $v_5 = 35.29$
$r_{10} = 1.9496$
$d_{10} = 0.4559$  $n_6 = 1.80610$    $v_6 = 40.95$
$r_{11} = -2.4895$
$h_1/f_1 = 0.535$   $h_4/f_4 = 0.277$
$(h_1/f_1)/(h_4/f_4) = 1.931$
$f_1 = -1.35$      $f_2 = 1.425$      $f_{23} = 0.96$
$f_4 = -1.95$      $R_2 = -9.5318$    $R_2' = 1.1738$
$R_3 = 1.7243$     $R_3' = -0.522$

---

Embodiment 5
f = 1.00   F/3.438   image height 1.1036
angle of view 101°

$r_1 = \infty$ (aspherical)
$d_1 = 0.2770$     $n_1 = 1.51633$     $v_1 = 64.15$
$r_2 = 0.7047$
$d_2 = 1.3918$
$r_3 = 1.8404$
$d_3 = 0.2770$     $n_2 = 1.74100$     $v_2 = 52.68$
$r_4 = -6.2624$
$d_4 = 0.0554$
$r_5 = \infty$ (aperture diaphragm)
$d_5 = 0.0554$
$r_6 = 3.4891$
$d_6 = 0.6094$     $n_3 = 1.62041$     $v_3 = 60.27$
$r_7 = -0.5540$
$d_7 = 0.2216$     $n_4 = 1.80518$     $v_4 = 25.43$
$r_8 = -1.1104$
$d_8 = 0.9041$
$r_9 = -0.6186$
$d_9 = 0.2770$     $n_5 = 1.72825$     $v_5 = 28.46$
$r_{10} = -1.0830$
$h_1/f_1 = 0.565$   $h_4/f_4 = 0.221$
$(h_1/f_1)/(h_4/f_4) = 2.557$
$E_1 = 0.46954 \times 10^{-1}$
$f_1 = -1.57$      $f_2 = 1.948$      $f_{23} = 1.14$
$f_4 = -2.65$      $R_2 = -6.2624$    $R_2' = 1.8404$
$R_3 = 3.4891$     $R_3' = -0.554$

---

Embodiment 6
f = 1.00   F/3.365   image height 1.0969
angle of view 98°

$r_1 = \infty$ (aspherical)
$d_1 = 0.2753$     $n_1 = 1.51633$     $v_1 = 64.15$
$r_2 = 0.7513$
$d_2 = 1.4662$
$r_3 = 2.3609$ -continued

| | | |
|---|---|---|
| $d_3 = 0.5507$ | $n_2 = 1.59270$ | $v_2 = 35.29$ |
| $r_4 = -1.0953$ | | |
| $d_4 = 0.2203$ | $n_3 = 1.83400$ | $v_3 = 37.16$ |
| $r_5 = -2.7689$ | | |
| $d_5 = 0.0551$ | | |
| $r_6 = \infty$ (aperture diaphragm) | | |
| $d_6 = 0.0551$ | | |
| $r_7 = 2.3940$ | | |
| $d_7 = 0.6057$ | $n_4 = 1.62041$ | $v_4 = 60.27$ |
| $r_8 = -0.5884$ | | |
| $d_8 = 0.2203$ | $n_5 = 1.80518$ | $v_5 = 25.43$ |
| $r_9 = -1.1177$ | | |
| $d_9 = 0.8941$ | | |
| $r_{10} = -0.6526$ | | |
| $d_{10} = 0.2753$ | $n_6 = 1.84666$ | $v_6 = 23.88$ |
| $r_{11} = -0.9566$ | | |

$h_1/f_1 = 0.637$  $h_4/f_4 = 0.135$
$(h_1/f_1)/(h_4/f_4) = 4.72$
$E_1 = 0.58567 \times 10^{-1}$
$f_1 = -1.46$   $f_2 = 3.095$   $f_{23} = 1.27$
$f_4 = -4.15$   $R_2 = -2.7689$   $R_2' = 2.3609$
$R_3 = 2.394$   $R_3' = -0.5884$ Embodiment 7
$f = 1.00$  F/3.295  image height 1.1141
angle of view 99°

| | | |
|---|---|---|
| $r_1 = \infty$ (aspherical) | | |
| $d_1 = 0.2796$ | $n_1 = 1.51633$ | $v_1 = 64.15$ |
| $r_2 = 0.7952$ | | |
| $d_2 = 1.4787$ | | |
| $r_3 = 5.3878$ | | |
| $d_3 = 0.5593$ | $n_2 = 1.59270$ | $v_2 = 35.29$ |
| $r_4 = -0.7414$ | | |
| $d_4 = 0.2237$ | $n_3 = 1.83400$ | $v_3 = 37.16$ |
| $r_5 = -1.9280$ | | |
| $d_5 = 0.0559$ | | |
| $r_6 = \infty$ (aperture diaphragm) | | |
| $d_6 = 0.0559$ | | |
| $r_7 = 1.5169$ | | |
| $d_7 = 0.2237$ | $n_4 = 1.80518$ | $v_4 = 25.43$ |
| $r_8 = 0.6123$ | | |
| $d_8 = 0.6152$ | $n_5 = 1.56883$ | $v_5 = 56.34$ |
| $r_9 = -1.0448$ | | |
| $d_9 = 0.8849$ | | |
| $r_{10} = -0.7375$ | | |
| $d_{10} = 0.2796$ | $n_6 = 1.84666$ | $v_6 = 23.88$ |
| $r_{11} = -1.0612$ | | |

$h_1/f_1 = 0.631$  $h_4/f_4 = 0.12$
$(h_1/f_1)/(h_4/f_4) = 5.26$
$E_1 = 0.54347 \times 10^{-1}$
$f_1 = -1.54$   $f_2 = 4.471$   $f_{23} = 1.27$
$f_4 = -4.73$   $R_2 = -1.928$   $R_2' = 5.3878$
$R_3 = 1.5169$   $R_3' = 0.6123$ Embodiment 8
$f = 1.00$  F/3.0  image height 1.062
angle of view 119°

| | | |
|---|---|---|
| $r_1 = 4.6673$ | | |
| $d_1 = 0.3333$ | $n_1 = 1.883$ | $v_1 = 40.78$ |
| $r_2 = 0.864$ | | |
| $d_2 = 0.5867$ | | |
| $r_3 = \infty$ | | |
| $d_3 = 0.6667$ | $n_2 = 1.53172$ | $v_2 = 48.9$ |
| $r_4 = \infty$ | | |
| $d_4 = 0.5333$ | | |
| $r_5 = 2.6013$ | | |
| $d_5 = 0.9533$ | $n_3 = 1.741$ | $v_3 = 52.68$ |
| $r_6 = -2.6013$ | | |
| $d_6 = 0.0667$ | | |
| $r_7 = \infty$ (aperture diaphragm) | | |
| $d_7 = 0.0667$ | | |
| $r_8 = 1.7973$ | | |
| $d_8 = 0.70$ | $n_4 = 1.51633$ | $v_4 = 64.15$ |
| $r_9 = -0.964$ | | |
| $d_9 = 0.3333$ | $n_5 = 1.80518$ | $v_5 = 25.43$ |
| $r_{10} = -1.558$ | | |
| $d_{10} = 0.4667$ | | |
| $r_{11} = -0.8967$ | | |
| $d_{11} = 0.3333$ | $n_6 = 1.76182$ | $v_6 = 26.55$ |
| $r_{12} = -1.7693$ | | |
| $d_{12} = 0.420$ | | |
| $r_{13} = \infty$ | | |

-continued

| | | |
|---|---|---|
| $d_{13} = 0.6667$ | $n_7 = 1.51633$ | $v_7 = 64.15$ |
| $r_{14} = \infty$ | | |

$h_1/f_1 = 0.71$  $h_4/f_4 = 0.18$
$(h_1/f_1)/(h_4/f_4) = 3.967$
$f_1 = -1.25$   $f_2 = 1.90$   $f_{23} = 1.28$
$f_4 = -2.86$   $R_2 = -2.60$   $R_2' = 2.60$
$R_3 = 1.80$   $R_3' = -0.96$

Embodiment 9
$f = 1.00$  F/3.0  image height 0.92
angle of view 101°

| | | |
|---|---|---|
| $r_1 = 4.4097$ | | |
| $d_1 = 0.2877$ | $n_1 = 1.883$ | $v_1 = 40.78$ |
| $r_2 = 0.7457$ | | |
| $d_2 = 0.4816$ | | |
| $r_3 = 2.0242$ | | |
| $d_3 = 0.8705$ | $n_2 = 1.741$ | $v_2 = 52.68$ |
| $r_4 = \infty$ | | |
| $d_4 = 0.351$ | | |
| $r_5 = \infty$ | | |
| $d_5 = 0.3049$ | $n_3 = 1.741$ | $v_3 = 52.68$ |
| $r_6 = -2.0242$ | | |
| $d_6 = 0.0575$ | | |
| $r_7 = \infty$ (aperture diaphragm) | | |
| $d_7 = 0.0575$ | | |
| $r_8 = 1.6116$ | | |
| $d_8 = 0.5696$ | $n_4 = 1.51633$ | $v_4 = 64.15$ |
| $r_9 = -1.0213$ | | |
| $d_9 = 0.2301$ | $n_5 = 1.80518$ | $v_5 = 25.43$ |
| $r_{10} = -2.1617$ | | |
| $d_{10} = 0.0575$ | | |
| $r_{11} = \infty$ | | |
| $d_{11} = 0.2877$ | $n_6 = 1.53172$ | $v_6 = 48.9$ |
| $r_{12} = \infty$ | | |
| $d_{12} = 0.3625$ | | |
| $r_{13} = -0.8009$ | | |
| $d_{13} = 0.2301$ | $n_7 = 1.72825$ | $v_7 = 28.46$ |
| $r_{14} = -1.3705$ | | |
| $d_{14} = 0.3855$ | | |
| $r_{15} = \infty$ | | |
| $d_{15} = 0.5754$ | $n_8 = 1.51633$ | $v_8 = 64.15$ |
| $r_{16} = \infty$ | | |

$h_1/f_1 = 0.63$  $h_4/f_4 = 0.15$
$(h_1/f_1)/(h_4/f_4) = 4.344$
$f_1 = -1.06$   $f_2 = 1.57$   $f_{23} = 1.18$
$f_4 = -3.19$   $R_2 = -2.02$   $R_2' = 2.02$
$R_3 = 1.61$   $R_3' = -1.02$

Embodiment 10
$f = 1.00$  F/3.0  image height 1.063
angle of view 120°

| | | |
|---|---|---|
| $r_1 = 4.0027$ | | |
| $d_1 = 0.3336$ | $n_1 = 1.883$ | $v_1 = 40.78$ |
| $r_2 = 0.8672$ | | |
| $d_2 = 0.5337$ | | |
| $r_3 = \infty$ | | |
| $d_3 = 0.3336$ | $n_2 = 1.53172$ | $v_2 = 48.90$ |
| $r_4 = \infty$ | | |
| $d_4 = 0.2763$ | | |
| $r_5 = 3.3266$ | | |
| $d_5 = 0.3885$ | $n_3 = 1.741$ | $v_3 = 52.68$ |
| $r_6 = -5.1676$ | | |
| $d_6 = 0.2001$ | | |
| $r_7 = -1.3143$ | | |
| $d_7 = 0.7465$ | $n_4 = 1.741$ | $v_4 = 52.68$ |
| $r_8 = -1.3763$ | | |
| $d_8 = 0.0667$ | | |
| $r_9 = \infty$ (aperture diaphragm) | | |
| $d_9 = 0.0667$ | | |
| $r_{10} = 1.1237$ | | |
| $d_{10} = 0.9237$ | $n_5 = 1.51633$ | $v_5 = 64.15$ |
| $r_{11} = -0.8226$ | | |
| $d_{11} = 0.2668$ | $n_6 = 1.80518$ | $v_6 = 25.43$ |
| $r_{12} = -1.4219$ | | |
| $d_{12} = 0.4003$ | | |
| $r_{13} = -0.8672$ | | |
| $d_{13} = 0.3336$ | $n_7 = 1.72825$ | $v_7 = 28.46$ |
| $r_{14} = -1.8779$ | | |
| $d_{14} = 0.6671$ | | |
| $r_{15} = \infty$ | | |
| $d_{15} = 0.3336$ | $n_8 = 1.51633$ | $v_8 = 64.15$ |
| $r_{16} = \infty$ | | |

-continued $h_1/f_1 = 0.76$  $h_4/f_4 = 0.20$
$(h_1/f_1)/(h_4/f_4) = 3.816$
$f_1 = -1.32$      $f_2 = 2.72$       $f_{23} = 1.23$
$f_4 = -2.57$      $R_2 = -1.38$      $R_2' = 3.33$
$R_3 = 1.12$       $R_3' = -0.82$

Embodiment 11
$f = 1.00$  $F/3.0$  image height 1.08
angle of view 121°

| | | | |
|---|---|---|---|
| $r_1 = 4.3525$ | | | |
| $d_1 = 0.339$ | | $n_1 = 1.883$ | $v_1 = 40.78$ |
| $r_2 = 0.7946$ | | | |
| $d_2 = 0.8793$ | | | |
| $r_3 = \infty$ | | | |
| $d_3 = 0.339$ | | $n_2 = 1.53172$ | $v_2 = 48.90$ |
| $r_4 = \infty$ | | | |
| $d_4 = 0.1627$ | | | |
| $r_5 = 2.5566$ | | | |
| $d_5 = 0.4746$ | | $n_3 = 1.72825$ | $v_3 = 28.46$ |
| $r_6 = -2.5566$ | | | |
| $d_6 = 0.1182$ | | | |
| $r_7 = \infty$ (aperture diaphragm) | | | |
| $d_7 = 0.2585$ | | | |
| $r_8 = 4.6183$ | | | |
| $d_8 = 0.6813$ | | $n_4 = 1.58913$ | $v_4 = 60.97$ |
| $r_9 = -0.8237$ | | | |
| $d_9 = 0.2712$ | | $n_5 = 1.80518$ | $v_5 = 25.43$ |
| $r_{10} = -1.6936$ | | | |
| $d_{10} = 0.1794$ | | | |
| $r_{11} = 2.4014$ | | | |
| $d_{11} = 0.4746$ | | $n_6 = 1.6583$ | $v_6 = 57.33$ |
| $r_{12} = -32.2502$ | | | |
| $d_{12} = 0.2936$ | | | |
| $r_{13} = -1.2908$ | | | |
| $d_{13} = 0.2373$ | | $n_7 = 1.80518$ | $v_7 = 25.43$ |
| $r_{14} = -7.7878$ | | | |
| $d_{14} = 0.3276$ | | | |
| $r_{15} = \infty$ | | | |
| $d_{15} = 0.678$ | | $n_8 = 1.54869$ | $v_8 = 45.55$ |
| $r_{16} = \infty$ | | | |

$h_1/f_1 = 0.48$  $h_4/f_4 = 0.32$
$(h_1/f_1)/(h_4/f_4) = 1.493$
$f_1 = -1.15$      $f_2 = 1.83$       $f_{23} = 1.29$
$f_4 = -1.95$      $R_2 = -2.56$      $R_2' = 2.56$
$R_3 = 4.62$       $R_3' = -0.82$

Embodiment 12
$f = 1.00$  $F/3.0$  image height 0.855
angle of view 100°

| | | | |
|---|---|---|---|
| $r_1 = \infty$ | | | |
| $d_1 = 0.2678$ | | $n_1 = 1.883$ | $v_1 = 40.78$ |
| $r_2 = 0.9363$ | | | |
| $d_2 = 0.3749$ | | | |
| $r_3 = \infty$ | | | |
| $d_3 = 2.6888$ | | $n_2 = 1.8061$ | $v_2 = 40.95$ |
| $r_4 = \infty$ (aperture diaphragm) | | | |
| $d_4 = 0.1071$ | | | |
| $r_5 = 2.3091$ | | | |
| $d_5 = 0.5196$ | | $n_3 = 1.64769$ | $v_3 = 33.80$ |
| $r_6 = -2.3091$ | | | |
| $d_6 = 0.0536$ | | | |
| $r_7 = 2.5522$ | | | |
| $d_7 = 0.7231$ | | $n_4 = 1.51633$ | $v_4 = 64.15$ |
| $r_8 = -1.0198$ | | | |
| $d_8 = 0.2678$ | | $n_5 = 1.84666$ | $v_5 = 23.78$ |
| $r_9 = -5.4772$ | | | |
| $d_9 = 0.4713$ | | | |
| $r_{10} = \infty$ | | | |
| $d_{10} = 0.4178$ | | $n_6 = 1.51633$ | $v_6 = 64.15$ |
| $r_{11} = -1.5629$ | | | |
| $d_{11} = 0.0536$ | | | |
| $r_{12} = \infty$ | | | |
| $d_{12} = 0.2678$ | | $n_7 = 1.53172$ | $v_7 = 48.90$ |
| $r_{13} = \infty$ | | | |
| $d_{13} = 0.2892$ | | | |
| $r_{14} = -1.0311$ | | | |
| $d_{14} = 0.2678$ | | $n_8 = 1.883$ | $v_8 = 40.78$ |
| $r_{15} = -1.8843$ | | | |
| $d_{15} = 0.5142$ | | | |
| $r_{16} = \infty$ | | | |
| $d_{16} = 0.5356$ | | $n_9 = 1.51633$ | $v_9 = 64.15$ |
| $r_{17} = \infty$ | | | |

$h_1/f_1 = 0.56$  $h_4/f_4 = 0.18$
$(h_1/f_1)/(h_4/f_4) = 3.082$
$f_1 = -1.06$      $f_2 = 1.87$       $f_{23} = 1.63$
$f_4 = -3.02$      $R_2 = -2.3091$    $R_2' = 2.3091$
$R_3 = 2.5522$     $R_3' = -1.0198$

Embodiment 13
$f = 1.00$  $F/3.0$  image height 1.147
angle of view 100°

| | | | |
|---|---|---|---|
| $r_1 = 6.0105$ | | | |
| $d_1 = 0.3592$ | | $n_1 = 1.883$ | $v_1 = 40.78$ |
| $r_2 = 0.8194$ (aspherical) | | | |
| $d_2 = 0.7184$ | | | |
| $r_3 = 9.2577$ | | | |
| $d_3 = 0.3592$ | | $n_2 = 1.53172$ | $v_2 = 48.90$ |
| $r_4 = -30.2947$ | | | |
| $d_4 = 0.3879$ | | | |
| $r_5 = 2.6624$ | | | |
| $d_5 = 0.5029$ | | $n_3 = 1.72825$ | $v_3 = 28.46$ |
| $r_6 = -3.7679$ | | | |
| $d_6 = 0.1252$ | | | |
| $r_7 = \infty$ (aperture diaphragm) | | | |
| $d_7 = 0.274$ | | | |
| $r_8 = 4.8937$ | | | |
| $d_8 = 0.6552$ | | $n_4 = 1.58913$ | $v_4 = 60.97$ |
| $r_9 = -0.8923$ | | | |
| $d_9 = 0.2874$ | | $n_5 = 1.80518$ | $v_5 = 25.43$ |
| $r_{10} = -1.5847$ | | | |
| $d_{10} = 0.1901$ | | | |
| $r_{11} = 2.5445$ | | | |
| $d_{11} = 0.5029$ | | $n_6 = 1.6583$ | $v_6 = 57.33$ |
| $r_{12} = -34.1731$ | | | |
| $d_{12} = 0.30$ | | | |
| $r_{13} = -1.3263$ | | | |
| $d_{13} = 0.2514$ | | $n_7 = 1.80518$ | $v_7 = 25.43$ |
| $r_{14} = -7.5450$ (aspherical) | | | |
| $d_{14} = 0.3471$ | | | |
| $r_{15} = \infty$ | | | |
| $d_{15} = 0.7184$ | | $n_8 = 1.54869$ | $v_8 = 45.55$ |
| $r_{16} = \infty$ | | | |

$h_1/f_1 = 0.43$  $h_4/f_4 = 0.29$
$(h_1/f_1)/(h_4/f_4) = 1.517$
$E_2 = 0.51666 \times 10^{-1}$  $F_2 = 0.1371$
$E_{14} = 0.17323$  $F_{14} = 0$
$f_1 = -1.29$      $f_2 = 2.22$       $f_{23} = 1.37$
$f_4 = -2.04$      $R_2 = -3.768$     $R_2' = 2.66$
$R_3 = 4.89$       $R_3' = -0.89$

Embodiment 14
$f = 1.00$  $F/3.1$  image height 1.14
angle of view 138°

| | | | |
|---|---|---|---|
| $r_1 = 5.7266$ | | | |
| $d_1 = 0.3573$ | | $n_1 = 1.883$ | $v_1 = 40.78$ |
| $r_2 = 0.8615$ | | | |
| $d_2 = 1.6801$ | | | |
| $r_3 = 1.7123$ | | | |
| $d_3 = 0.8102$ | | $n_2 = 1.713$ | $v_2 = 53.84$ |
| $r_4 = -3.5156$ | | | |
| $d_4 = 0.0039$ | | | |
| $r_5 = \infty$ (aperture diaphragm) | | | |
| $d_5 = 0.0659$ | | | |
| $r_6 = 2.4711$ | | | |
| $d_6 = 0.6563$ | | $n_3 = 1.51633$ | $v_3 = 64.15$ |
| $r_7 = -0.7133$ | | | |
| $d_7 = 0.2863$ | | $n_4 = 1.80518$ | $v_4 = 25.43$ |
| $r_8 = -1.2246$ | | | |
| $d_8 = 0.0636$ | | | |
| $r_9 = \infty$ | | | |
| $d_9 = 0.1034$ | | $n_5 = 1.53172$ | $v_5 = 48.90$ |
| $r_{10} = \infty$ | | | |
| $d_{10} = 0.1720$ | | | |
| $r_{11} = -0.9620$ | | | |
| $d_{11} = 0.2147$ | | $n_6 = 1.72825$ | $v_6 = 28.46$ |
| $r_{12} = -2.5078$ | | | |
| $d_{12} = 0.0517$ | | | |
| $r_{13} = 7.1019$ | | | |
| $d_{13} = 0.5011$ | | $n_7 = 1.51633$ | $v_7 = 64.15$ |
| $r_{14} = -19.3899$ | | | |
| $d_{14} = 0.7158$ | | | |
| $r_{15} = \infty$ | | | |
| $d_{15} = 0.3579$ | | $n_8 = 1.51633$ | $v_8 = 64.15$ |

-continued $r_{16} = \infty$
$h_1/f_1 = 0.813$  $h_4/f_4 = 0.177$
$(h_1/f_1)/(h_4/f_4) = 4.59$
$f_1 = -1.189$   $f_2 = 1.726$      $f_{23} = 1.262$
$f_4 = -3.075$   $R_2 = -3.5156$    $R_2' = 1.7123$
$R_3 = 2.4711$   $R_3' = -0.7133$ Embodiment 15
f = 1.00  F/3.1  image height 1.2
angle of view 140°

$r_1 = 3.1833$
$d_1 = 0.3782$       $n_1 = 1.883$    $v_1 = 40.78$
$r_2 = 0.8334$
$d_2 = 1.7146$
$r_3 = 2.43$
$d_3 = 0.7182$       $n_2 = 1.713$    $v_2 = 53.84$
$r_4 = -2.2325$
$d_4 = 0.025$
$r_5 = \infty$ (aperture diaphragm)
$d_5 = 0.0546$
$r_6 = 7.1362$
$d_6 = 0.5463$       $n_3 = 1.51633$  $v_3 = 64.15$
$r_7 = -0.7591$
$d_7 = 0.2185$       $n_4 = 1.80518$  $v_4 = 25.43$
$r_8 = -1.293$
$d_8 = 0.0672$
$r_9 = \infty$
$d_9 = 0.1092$       $n_5 = 1.53172$  $v_5 = 48.90$
$r_{10} = \infty$
$d_{10} = 0.302$
$r_{11} = -0.888$
$d_{11} = 0.2731$    $n_6 = 1.72825$  $v_6 = 28.46$
$r_{12} = -1.1927$
$d_{12} = 0.0546$
$r_{13} = 10.5247$
$d_{13} = 0.5295$    $n_7 = 1.51633$  $v_7 = 64.15$
$r_{14} = 117.0536$
$d_{14} = 0.7564$
$r_{15} = \infty$
$d_{15} = 0.3782$    $n_8 = 1.51633$  $v_8 = 64.15$
$r_{16} = \infty$
$h_1/f_1 = 0.801$  $h_4/f_4 = 0.0488$
$(h_1/f_1)/(h_4/f_4) = 16.41$
$f_1 = -1.383$   $f_2 = 1.744$      $f_{23} = 1.335$
$f_4 = -12.545$  $R_2 = -2.2325$    $R_2' = 2.43$
$R_3 = 7.1362$   $R_3' = -0.7591$ where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, $v_1, v_2, \ldots$ respectively represent Abbe's numbers of respective materials, $E_1$ represents the coefficient of the aspherical surface of the 1st surface, $E_2$, $F_2$ represent the coefficients the aspherical surface of the 2nd surface, and $E_{14}$, $F_{14}$ represent the coefficients of the aspherical surface of the 14th surface.

Figure 5:
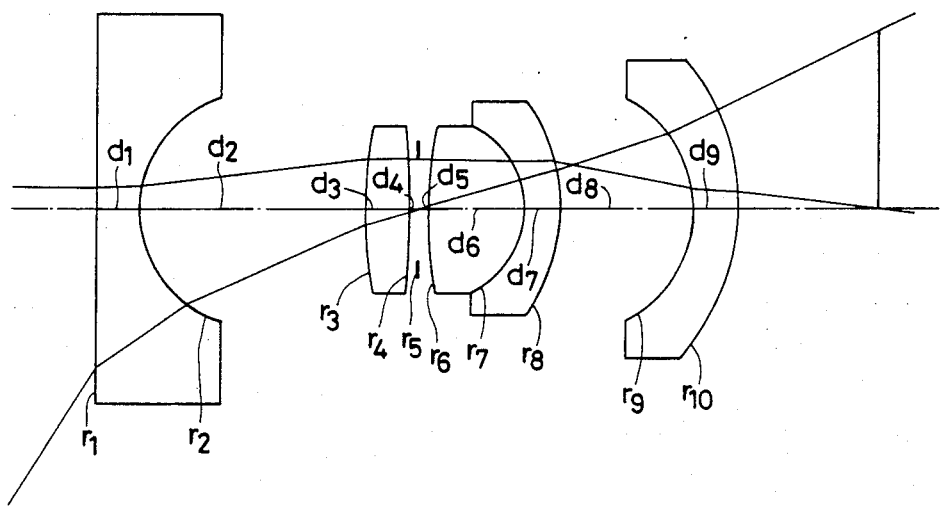
FIGS. 5 through 19 respectively show sectional views of Embodiments 1 through 15 according to the present invention.
Figure 6:
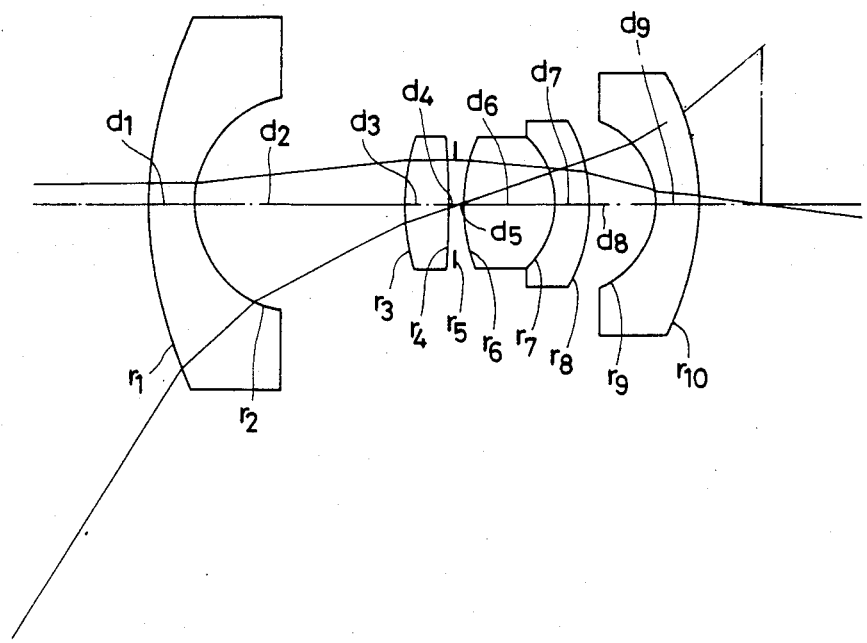

In the above mentioned Embodiments, Embodiment 1 and Embodiment 2 respectively have the lens configurations as shown in FIG. 5 and FIG. 6, where in either case, the first lens component is arranged as a negative lens, the second lens component is arranged as a positive lens, the third lens component is arranged as a positive cemented lens and the fourth lens component is arranged as a meniscus lens having its concave surface facing the object side. In these Embodiments, the aperture diaphragm is arranged between the second lens component and the third lens component.

Figure 7:
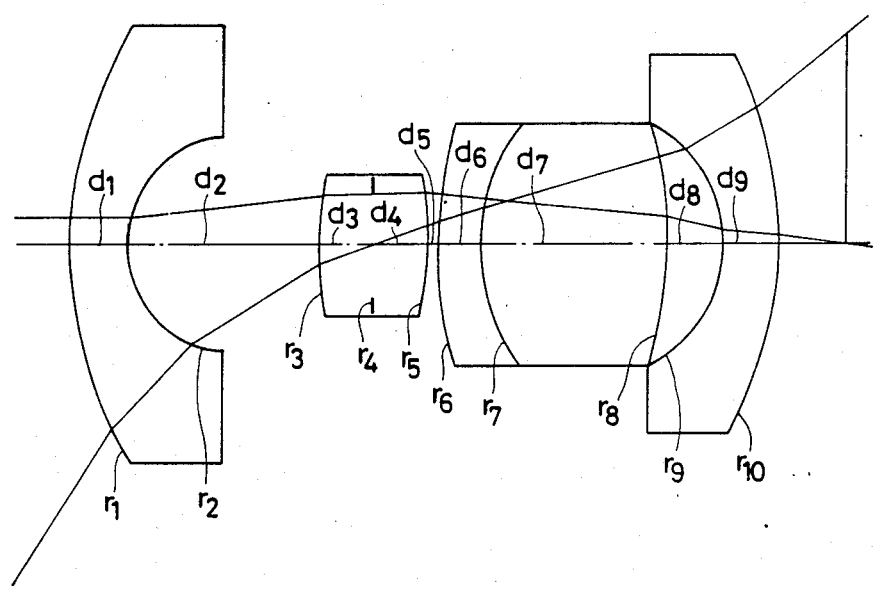

Embodiment 3 has the lens configuration as shown in FIG. 7 which is similar to the configurations of Embodiments 1 and 2 except that the aperture diaphragm is in the second lens component.

Figure 8:
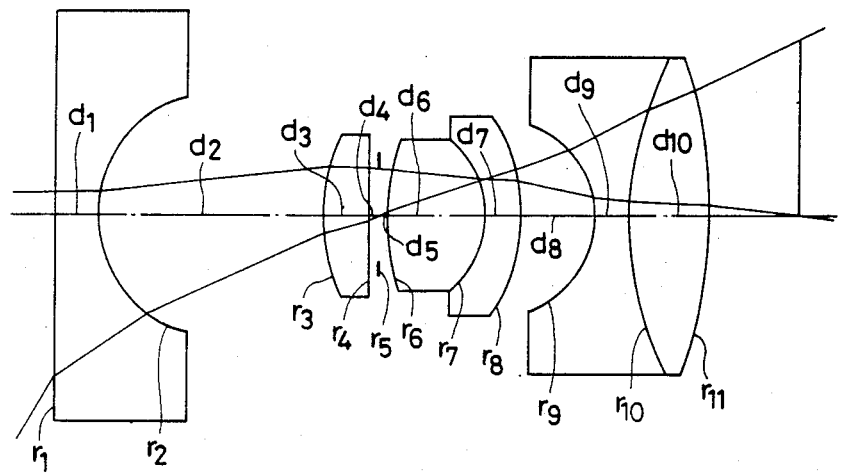

Embodiment 4 has the lens configuration as shown in FIG. 8 where the fourth lens component is arranged as a cemented meniscus lens having its concave surface facing the object side. The aperture diaphragm in this Embodiment is arranged between the second lens component and the third lens component.

Figure 9:
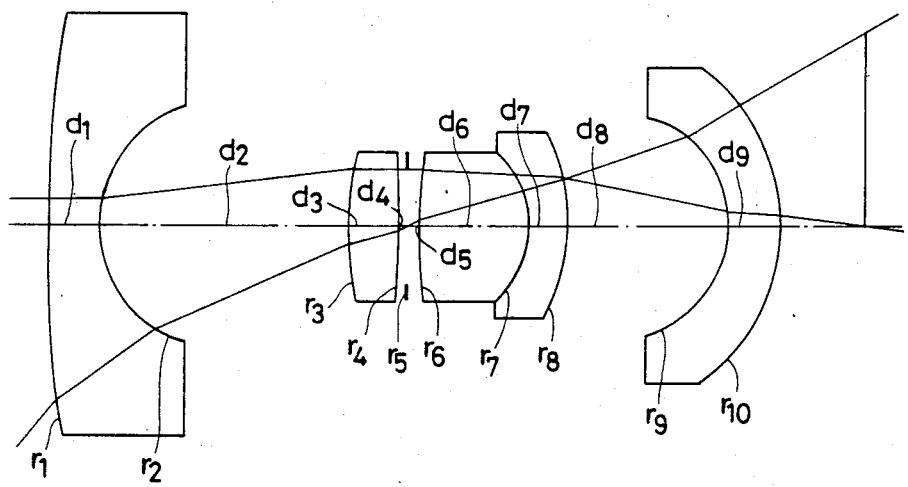

Embodiment 5 has the lens configuration as shown in FIG. 9 which is similar to the configuration of Embodiment 1 except that the object side surface of the first lens component is an aspherical surface of the above mentioned shape.

Figure 10:
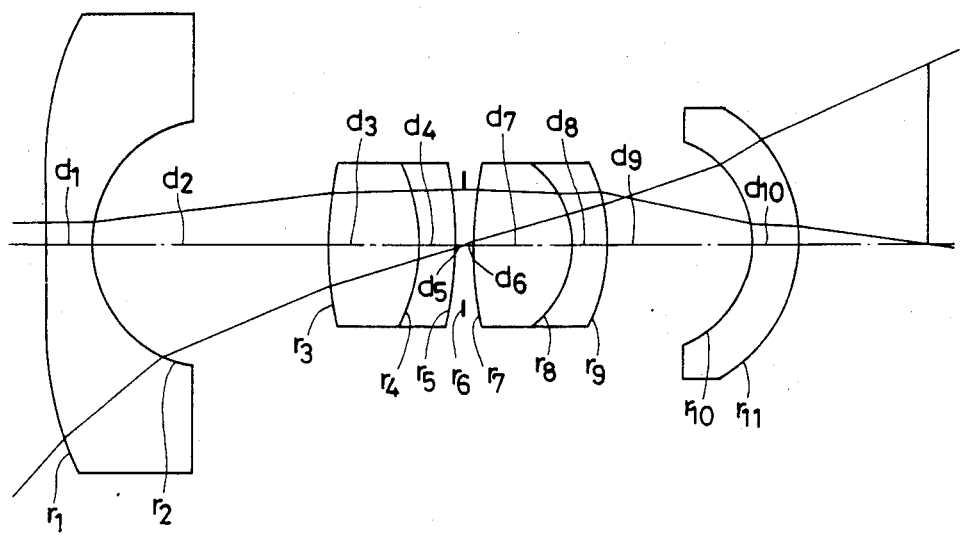
Figure 11:
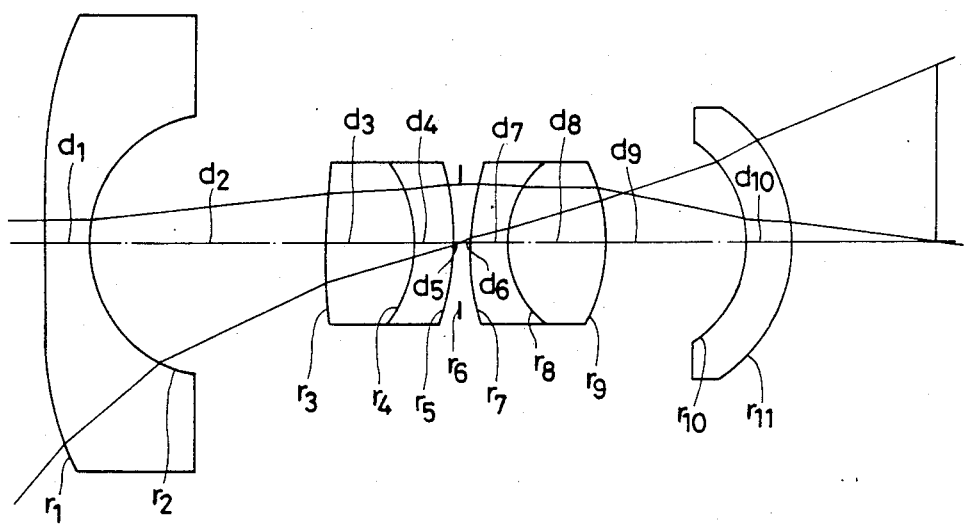

Embodiments 6 and 7 respectively have the lens configurations as shown in FIGS. 10 and 11, where in either case, both the second lens component and the third lens component are arranged as cemented lenses, and the object side surface of a negative lens of the first lens component is aspherical. In these Embodiments, the aperture diaphragm is arranged between the second lens component and the third lens component in either case.

The aspherical surfaces of these Embodiments 5, 6, and 7 are expressed by the following formula with the coordinates the origin of which is set at the vertex of those surfaces.

$$x = Ey^4$$

Each coefficient E of the aspherical surfaces of these Embodiments is as shown in the data.

Figure 12:
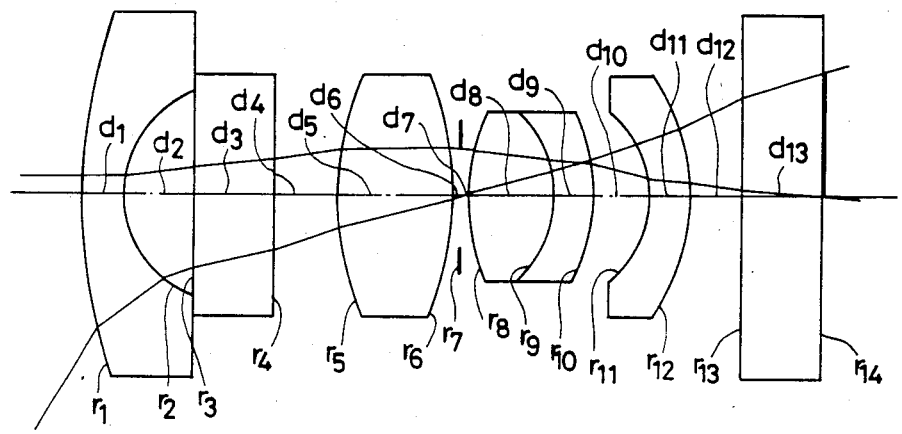

Embodiment 8 has the lens configuration as shown in FIG. 12, where the first lens component is arranged as a negative lens, the second lens component is arranged as a positive lens, the third lens component is arranged as a positive cemented lens and the fourth lens component is arranged as a meniscus lens having its concave surface facing the object side. The aperture diaphragm is arranged between the second lens component and the third lens component.

Figure 13:
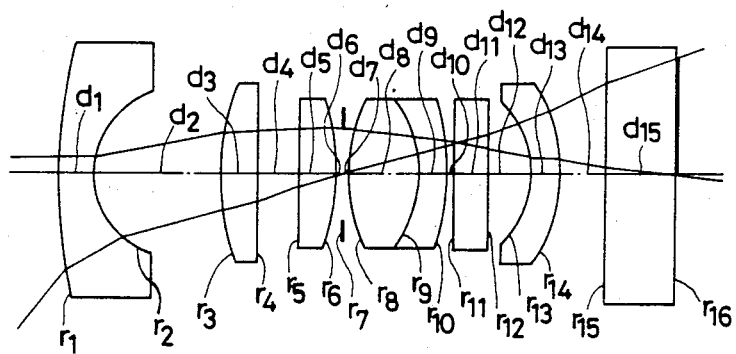

Embodiment 9 has the lens configuration as shown in FIG. 13, where the first lens component is arranged as a negative lens, the second lens component is arranged as two positive lenses, the third lens component is arranged as a positive cemented lens and the fourth lens component is arranged as a meniscus lens having its concave surface facing the object side. The aperture diaphragm is arranged between the second lens component and the third lens component.

Figure 14:
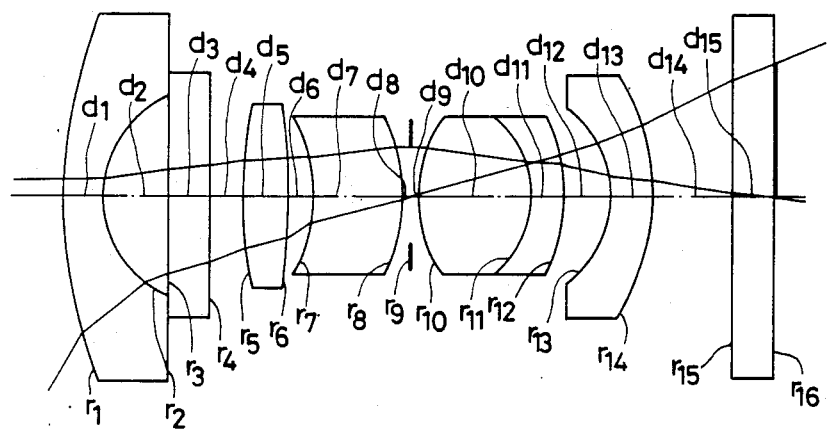

Embodiment 10 has the lens configuration as shown in FIG. 14, where the first lens component is arranged as a negative lens, the second lens component is arranged as two positive lenses, the third lens component is arranged as a positive cemented lens and the fourth lens component is arranged as a meniscus lens having its concave surface facing the object side. The aperture diaphragm is arranged between the second lens component and the third lens component.

Figure 15:
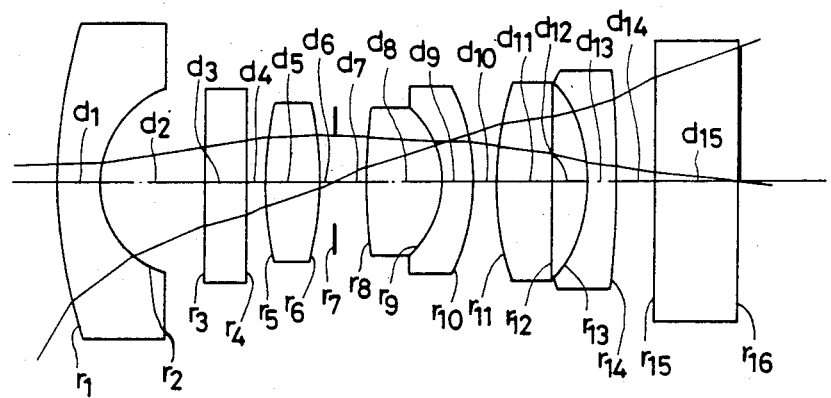

Embodiment 11 has the lens configuration as shown in FIG. 15, where the first lens component is arranged as a negative lens, the second lens component is arranged as a positive lens, the third lens component is arranged as a positive cemented lens and a positive lens, and the fourth lens component is arranged as a meniscus lens having its concave surface facing the object side. The aperture diaphragm is arranged between the second lens component and the third lens component.

Figure 16:
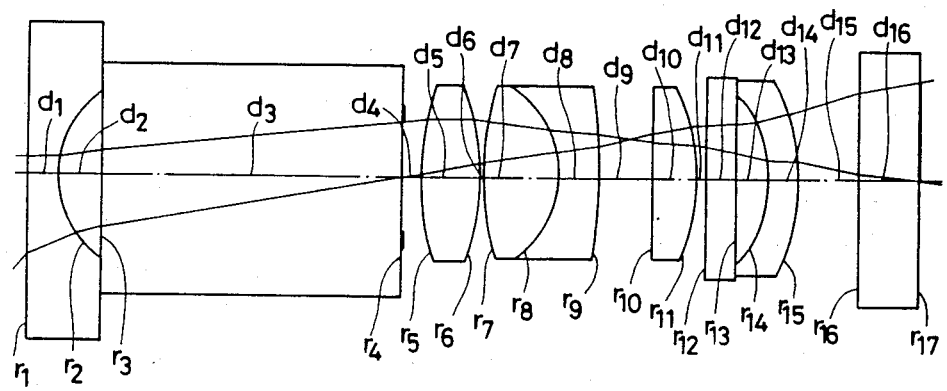

Embodiment 12 has the lens configuration as shown in FIG. 16, where the first lens component is arranged as a negative lens, the second lens component is arranged as a positive lens, the third lens component is arranged as a positive cemented lens and a positive lens, and the fourth lens component is arranged as a meniscus lens having its concave surface facing the object side.

The aperture diaphragm is arranged at the object side of the second component.

Figure 17:
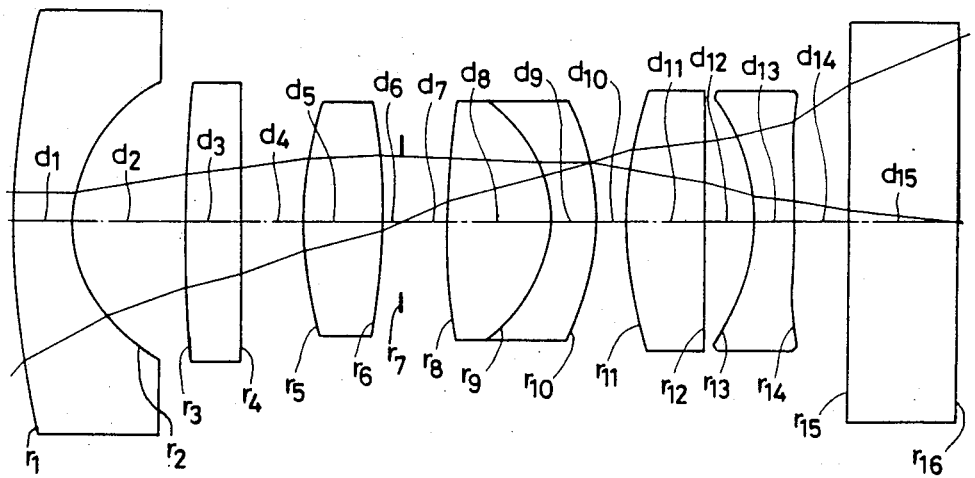

Embodiment 13 has the lens configuration as shown in FIG. 17, where the first lens component is arranged as a negative lens and a positive lens, the second lens component is arranged as a positive lens, the third lens component is arranged as a positive cemented lens and a positive lens, and the fourth lens component is arranged as a negative lens. The aperture diaphragm is arranged between the second lens component and the third lens component. Both the 2nd surface ($r_2$) and the 14th surface ($r_{14}$) of this Embodiment are the aspherical ones expressed by the following formula:

$$x = Ey^4 + Fy^6$$

Figure 18:
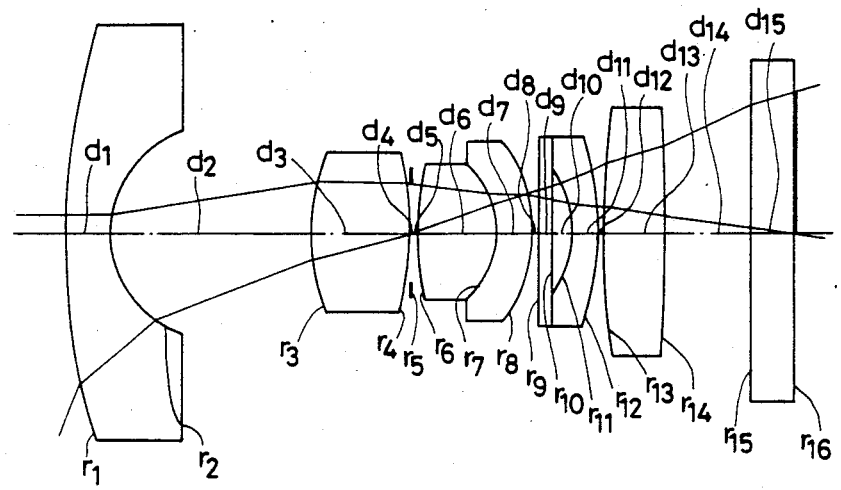

Embodiment 14 has the lens configuration as shown in FIG. 18, where the first lens component is arranged as a negative lens, the second lens component is arranged as a positive lens, the third lens component is arranged as a positive cemented lens, and the fourth lens component is arranged as a meniscus lens having its concave surface facing the object side and a positive lens. The aperture diaphragm is arranged between the second lens component and the third lens component.

Figure 19:
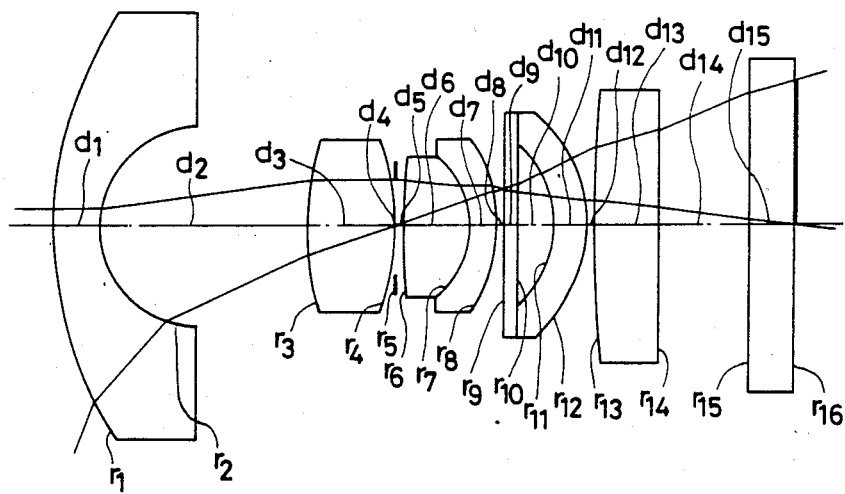
Figure 20:
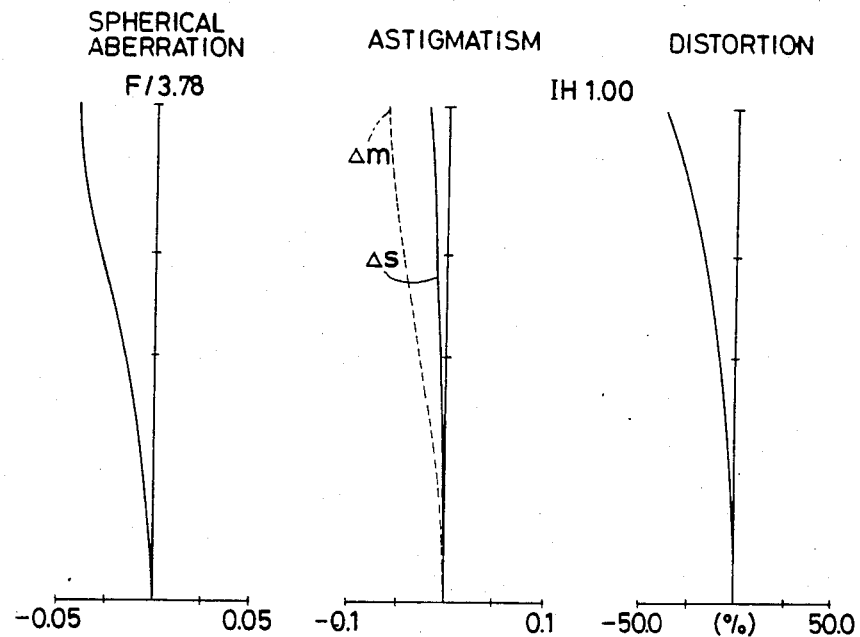
Figure 21:
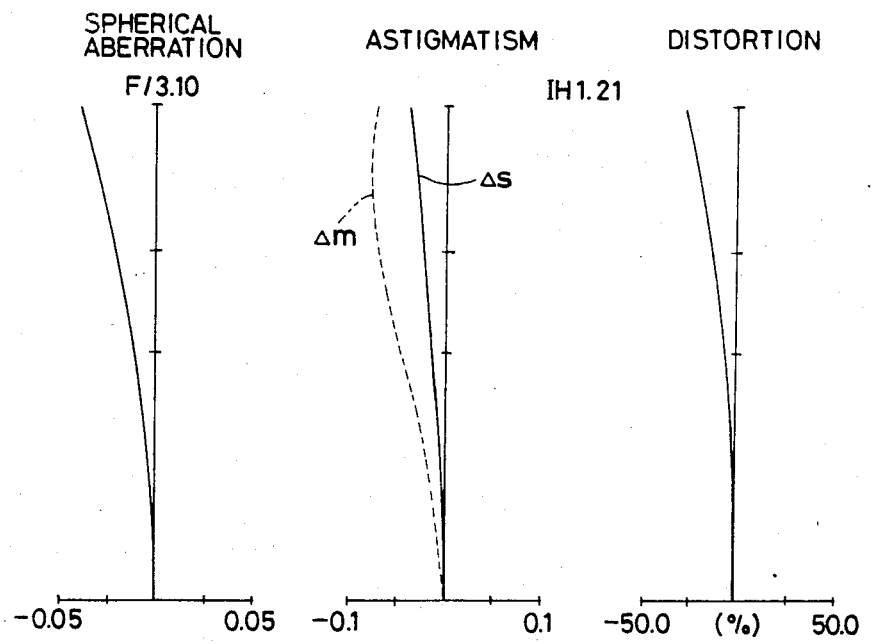
Figure 26:
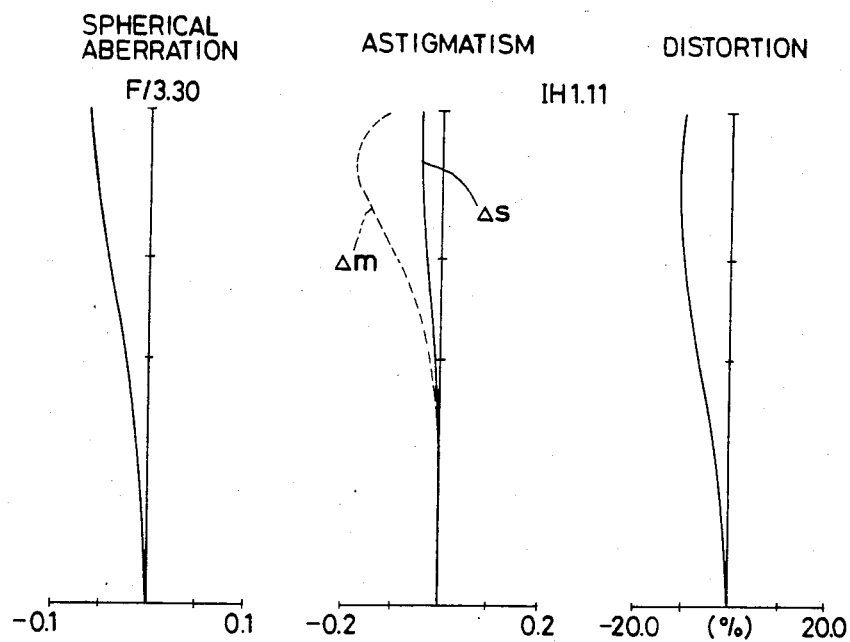
Figure 27:
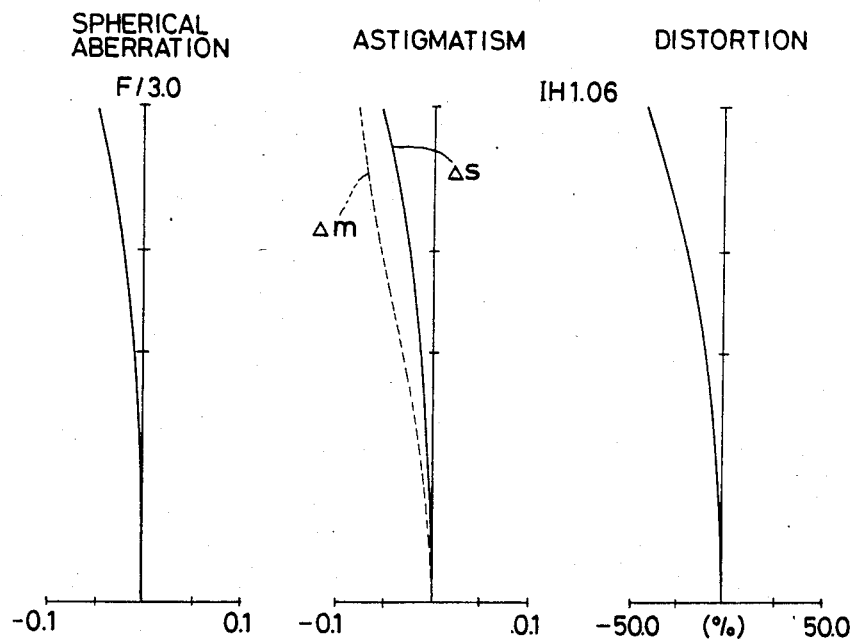
Figure 28:
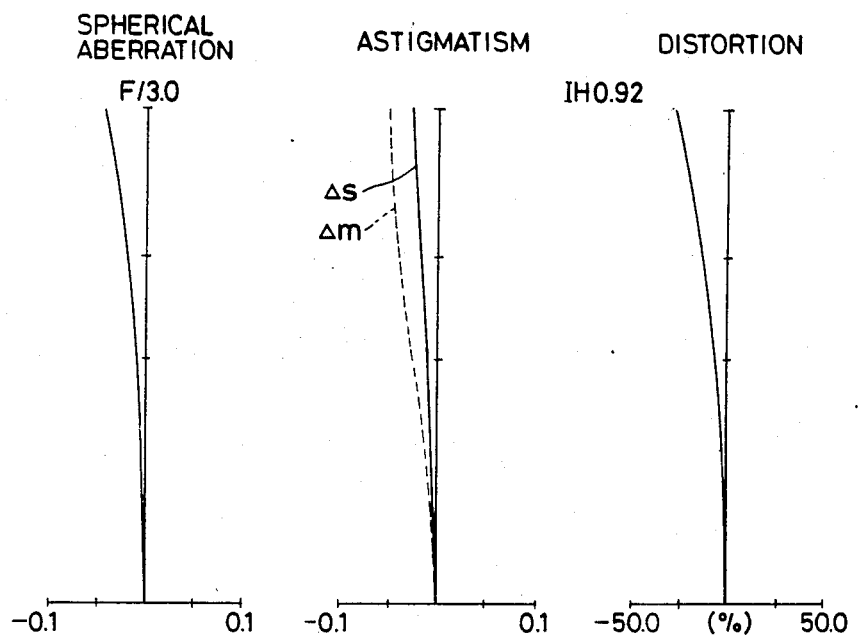
Figure 29:
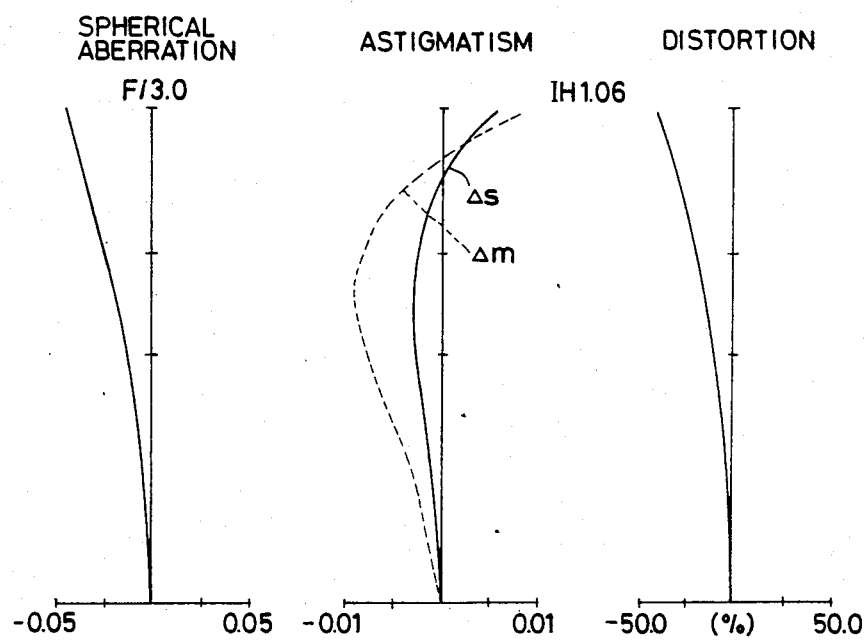
Figure 30:
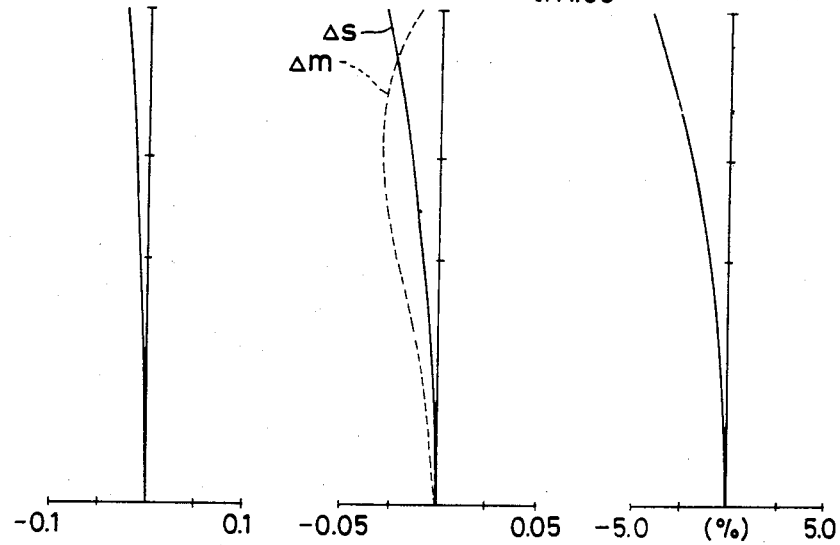
Figure 31:
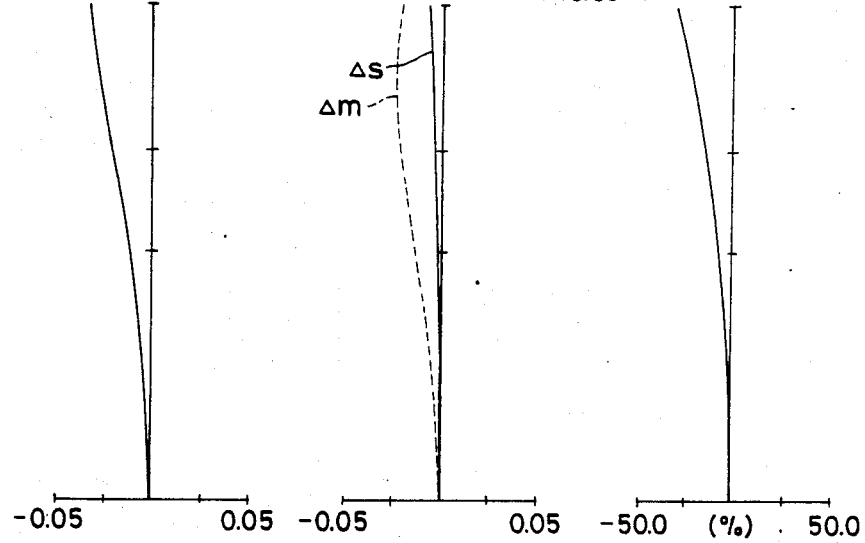
Figure 32:
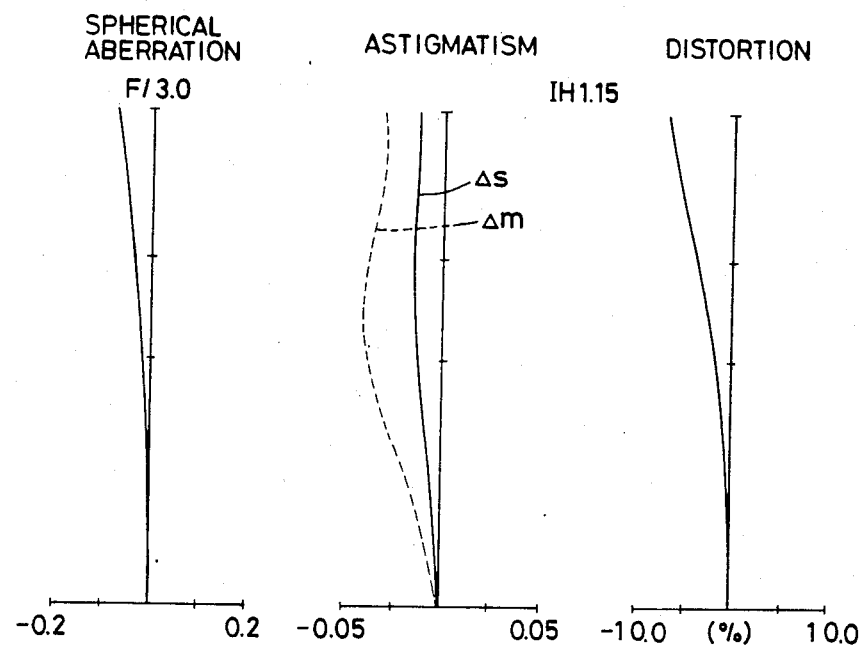
Figure 33:
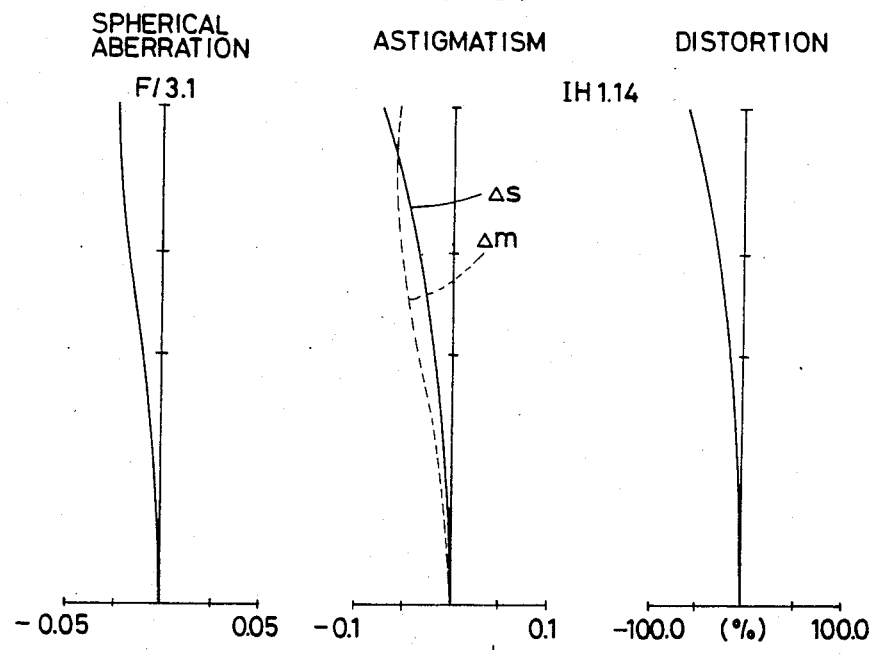

Embodiment 15 has the lens configuration as shown in FIG. 19, where the first lens component is arranged as a negative lens, the second lens component is arranged as a positive lens, the third lens component is arranged as a positive cemented lens, and the fourth lens component is arranged as a meniscus lens having its concave surface facing the object side and a positive lens. The aperture diaphragm is arranged between the second lens component and the third lens component.

As is mentioned above in detail and is evident from each preferred Embodiment, the objective lens system for an endoscope according to the present invention is the lens system of which distortion is small, the total length of the lens system is short, diameter of the lens is small, the angle of view is wide, and the illuminance in the peripheral portion of the image field is high.

We claim:

1. An objective lens system for an endoscope, comprising:
in order from the object side: a first lens component having a negative refracting power, a second lens component having a positive refracting power, a third lens component having a positive refracting power, and a fourth lens component involving a meniscus lens having its concave surface facing the object side;
said objective lens system satisfying the following conditions (1), (2), (3) and (4):

$$|h_1 f_1| > 1.15 |h_4/f_4| \tag{1}$$

$$F_2 < 3.5 \, f \tag{2}$$

$$|f_4| < 6 \, f \tag{3}$$

$$-R_2 \leq 15 \, f \tag{4}$$

wherein $h_1$ and $h_4$ represent the mean values of the heights of the principal ray at respective surfaces of said first lens component and said fourth lens component, $f_1$ and $f_4$ represent the focal lengths of the first lens component and the fourth lens component, respectively, $f_2$ represents the focal length of the second lens component, $f$ represents the focal length of the objective lens system, and $R_2$ represents the radius of curvature of the image side surface of said second lens component.

2. An objective lens system for an endoscope according to claim 1, said third lens component being a cemented lens component, and further satisfying the following conditions (5) through (8):

$$|f_1| < 1.7 \, f \tag{5}$$

$$|f_{23}| < 1.7 \, f \tag{6}$$

$$R_2' > 0 \tag{7}$$

$$R_3 < 5 \, f \tag{8}$$

$$|R_3'| < 3 \, f \tag{9}$$

where $f_{23}$ represents the composite focal length of said second lens component and said third lens component, $R_2'$ represents the radius of curvature of said outermost surface of said second lens component towards the object, $R_3$ represents the radius of curvature of the outermost surface of the third lens component towards the object, $R_3'$ represents the radius of curvature of the cemented surface of said third lens component.

3. An objective lens system for an endoscope according to claim 2, said first lens component being a negative single lens, said second lens component being a biconvex lens, said third lens component being a cemented lens component comprising a positive lens and a negative lens, and said fourth lens component being a negative meniscus lens, wherein said aperture diaphragm is arranged between said second lens component and said third lens component, and said objective lens system for an endoscope has the following numerical data:

| $f = 1.00$ | F/3.78 | image height 1.0040 |
|---|---|---|
| | angle of view 115° | |
| $r_1 = \infty$ | | |
| $d_1 = 0.2520$ | $n_1 = 1.51633$ | $v_1 = 64.15$ |
| $r_2 = 0.6655$ | | |
| $d_2 = 1.2601$ | | |
| $r_3 = 2.2444$ | | |
| $d_3 = 0.2520$ | $n_2 = 1.74100$ | $v_2 = 52.68$ |
| $r_4 = -6.8676$ | | |
| $d_4 = 0.0504$ | | |
| $r_5 = \infty$ (aperture diaphragm) | | |
| $d_5 = 0.0504$ | | |
| $r_6 = 2.5764$ | | |
| $d_6 = 0.5544$ | $n_3 = 1.62041$ | $v_3 = 60.27$ |
| $r_7 = -0.5040$ | | |
| $d_7 = 0.2016$ | $n_4 = 1.80518$ | $v_4 = 25.43$ |
| $r_8 = -0.9738$ | | |
| $d_8 = 0.7436$ | | |
| $r_9 = -0.6990$ | | |
| $d_9 = 0.2520$ | $n_5 = 1.72825$ | $v_5 = 28.46$ |
| $r_{10} = -1.2601$ | | |
| $h_1/f_1 = 0.541$ | $h_4/f_4 = 0.184$ | |
| $(h_1/f_1)/(h_4/f_4) = 2.94$ | | |
| $f_1 = -1.29$ | $f_2 = 2.31$ | $f_{23} = 1.08$ |
| $f_4 = -2.66$ | $R_2 = -6.8676$ | $R_2' = 2.2444$ |
| $R_3 = 2.5764$ | $R_3' = -0.9738$ | | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, and $v_1, v_2, \ldots$ respectively represent Abbe's numbers of respective materials.

4. An objective lens system for an endoscope according to claim 2, said first lens component being a negative single lens, said second lens component being a biconvex lens, said third lens component being a cemented lens component comprising a positive lens and a negative lens, and said fourth lens component being a negative meniscus lens, wherein said aperture diaphragm is arranged between said second lens component and said third lens component, and said objective lens system for an endoscope has the following numerical data:

| f = 1.00 | F/3.14 | image height 1.2102 angle of view 115° | |
|---|---|---|---|
| $r_1 = 3.1235$ | | | |
| $d_1 = 0.3038$ | $n_1 = 1.65160$ | $v_1 = 58.52$ | |
| $r_2 = 0.7758$ | | | |
| $d_2 = 1.5519$ | | | |
| $r_3 = 1.7854$ | | | |
| $d_3 = 0.3038$ | $n_2 = 1.74100$ | $v_2 = 52.68$ | |
| $r_4 = -10.6273$ | | | |
| $d_4 = 0.0608$ | | | |
| $r_5 = \infty$ (aperture diaphragm) | | | |
| $d_5 = 0.0608$ | | | |
| $r_6 = 1.5013$ | | | |
| $d_6 = 0.6683$ | $n_3 = 1.62041$ | $v_3 = 60.27$ | |
| $r_7 = -0.6075$ | | | |
| $d_7 = 0.2430$ | $n_4 = 1.80518$ | $v_4 = 25.43$ | |
| $r_8 = -1.2264$ | | | |
| $d_8 = 0.4860$ | | | |
| $r_9 = -0.6198$ | | | |
| $d_9 = 0.3038$ | $n_5 = 1.72825$ | $v_5 = 28.46$ | |
| $r_{10} = -1.8226$ | | | |
| $h_1/f_1 = 0.558$ | $h_4/f_4 = 0.388$ | | |
| $(h_1/f_1)/(h_4/f_4) = 1.44$ | | | |
| $f_1 = -1.67$ | $f_2 = 2.0846$ | $f_{23} = 1.04$ | |
| $f_4 = -1.44$ | $R_2 = -10.6273$ | $R_2' = 1.7854$ | |
| $R_3 = 1.5013$ | $R_3' = -0.6075$ | | | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, and $v_1, v_2, \ldots$ respectively represent Abbe's numbers of respective materials.

5. An objective lens system for an endoscope according to claim 2, said first lens component being a negative single lens, said second lens component being a biconvex lens, said third lens component being a cemented lens component comprising a positive lens and a negative lens, and said fourth lens component being a negative meniscus lens, wherein said aperture diaphragm is arranged in said second lens component, and said objective lens system for an endoscope has the following numerical data:

| f = 1.00 | F/3.228 | image height 1.1914 angle of view 114° | |
|---|---|---|---|
| $r_1 = 2.3923$ | | | |
| $d_1 = 0.2990$ | $n_1 = 1.51633$ | $v_1 = 64.15$ | |
| $r_2 = 0.5981$ | | | |
| $d_2 = 1.0830$ | | | |
| $r_3 = 2.5608$ | | | |
| $d_3 = 0.2990$ | $n_2 = 1.74100$ | $v_2 = 52.68$ | |
| $r_4 = \infty$ (aperture diaphragm) | | | |
| $d_4 = 0.2990$ | $n_3 = 1.74100$ | $v_3 = 52.68$ | |
| $r_5 = -1.6972$ | | | |
| $d_5 = 0.0598$ | | | |
| $r_6 = 2.4832$ | | | |
| $d_6 = 0.2392$ | $n_4 = 1.71736$ | $v_4 = 29.51$ | |
| $r_7 = 1.0766$ | | | |
| $d_7 = 1.0391$ | $n_5 = 1.71300$ | $v_5 = 53.84$ | |
| $r_8 = -2.0701$ | | | |
| $d_8 = 0.3069$ | | | |
| $r_9 = -0.7419$ | | | |
| $d_9 = 0.2990$ | $n_5 = 1.72825$ | $v_5 = 28.46$ | |
| $r_{10} = -2.4014$ | | | |
| $h_1/f_1 = 0.479$ | $h_4/f_4 = 0.411$ | | |

-continued

| f = 1.00 | F/3.228 | image height 1.1914 angle of view 114° | |
|---|---|---|---|
| $(h_1/f_1)/(h_4/f_4) = 1.165$ | | | |
| $f_1 = -1.64$ | $f_2 = 1.465$ | $f_{23} = 1.02$ | |
| $f_4 = -1.60$ | $R_2 = -1.6972$ | $R_2' = 2.5608$ | |
| $R_3 = 2.4832$ | $R_3' = 1.0766$ | | | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, and $v_1, v_2, \ldots$ respectively represent Abbe's numbers of respective materials.

6. An objective lens system for an endoscope according to claim 2, said first lens component being a negative single lens, said second lens component being a biconvex lens, said third lens component being a cemented lens component comprising a positive lens and a negative lens, and said fourth lens component being a cemented lens component comprising a negative lens and a positive lens, wherein said aperture diaphragm is arranged between said second lens component and said third lens component, and said objective lens system for an endoscope has the following numerical data:

| f = 1.00 | F/3.781 | image height 1.0091 angle of view 115° | |
|---|---|---|---|
| $r_1 = \infty$ | | | |
| $d_1 = 0.2533$ | $n_1 = 1.51633$ | $v_1 = 64.15$ | |
| $r_2 = 0.6947$ | | | |
| $d_2 = 1.2665$ | | | |
| $r_3 = 1.1738$ | | | |
| $d_3 = 0.2533$ | $n_2 = 1.74100$ | $v_2 = 52.68$ | |
| $r_4 = -9.5318$ | | | |
| $d_4 = 0.0507$ | | | |
| $r_5 = \infty$ (aperture diaphragm) | | | |
| $d_5 = 0.0507$ | | | |
| $r_6 = 1.7243$ | | | |
| $d_6 = 0.5572$ | $n_3 = 1.51633$ | $v_3 = 64.15$ | |
| $r_7 = -0.5220$ | | | |
| $d_7 = 0.2026$ | $n_4 = 1.80518$ | $v_4 = 25.43$ | |
| $r_8 = -0.9198$ | | | |
| $d_8 = 0.4008$ | | | |
| $r_9 = -0.5470$ | | | |
| $d_9 = 0.2026$ | $n_5 = 1.59270$ | $v_5 = 35.29$ | |
| $r_{10} = 1.9496$ | | | |
| $d_{10} = 0.4559$ | $n_6 = 1.80610$ | $v_6 = 40.95$ | |
| $r_{11} = -2.4895$ | | | |
| $h_1/f_1 = 0.535$ | $h_4/f_4 = 0.277$ | | |
| $(h_1/f_1)/(h_4/f_4) = 1.931$ | | | |
| $f_1 = -1.35$ | $f_2 = 1.425$ | $f_{23} = 0.96$ | |
| $f_4 = -1.95$ | $R_2 = -9.5318$ | $R_2' = 1.1738$ | |
| $R_3 = 1.7243$ | $R_3' = -0.522$ | | | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, and $v_1, v_2, \ldots$ respectively represent Abbe's numbers of respective materials.

7. An objective lens system for an endoscope according to claim 2, said first lens component being a negative single lens, said second lens component being a biconvex lens, said third lens component being a cemented lens component comprising a positive lens and a negative lens, and said fourth lens component being a negative meniscus lens, wherein said aperture diaphragm is arranged between said second lens component and said third lens component, and said objective lens system for an endoscope has the following numerical data:

| f = 1.00    F/3.0    image height 1.062 angle of view 119° | | | |
|---|---|---|---|
| $r_1 = 4.6673$ | | | |
| $d_1 = 0.3333$ | | $n_1 = 1.883$ | $v_1 = 40.78$ |
| $r_2 = 0.864$ | | | |
| $d_2 = 0.5867$ | | | |
| $r_3 = \infty$ | | | |
| $d_3 = 0.6667$ | | $n_2 = 1.53172$ | $v_2 = 48.9$ |
| $r_4 = \infty$ | | | |
| $d_4 = 0.5333$ | | | |
| $r_5 = 2.6013$ | | | |
| $d_5 = 0.9533$ | | $n_3 = 1.741$ | $v_3 = 52.68$ |
| $r_6 = -2.6013$ | | | |
| $d_6 = 0.0667$ | | | |
| $r_7 = \infty$ (aperture diaphragm) | | | |
| $d_7 = 0.0667$ | | | |
| $r_8 = 1.7973$ | | | |
| $d_8 = 0.70$ | | $n_4 = 1.51633$ | $v_4 = 64.15$ |
| $r_9 = -0.964$ | | | |
| $d_9 = 0.3333$ | | $n_5 = 1.80518$ | $v_5 = 25.43$ |
| $r_{10} = -1.558$ | | | |
| $d_{10} = 0.4667$ | | | |
| $r_{11} = -0.8967$ | | | |
| $d_{11} = 0.3333$ | | $n_6 = 1.76182$ | $v_6 = 26.55$ |
| $r_{12} = -1.7693$ | | | |
| $d_{12} = 0.420$ | | | |
| $r_{13} = \infty$ | | | |
| $d_{13} = 0.6667$ | | $n_7 = 1.51633$ | $v_7 = 64.15$ |
| $r_{14} = \infty$ | | | |
| $h_1/f_1 = 0.71$ | $h_4/f_4 = 0.18$ | | |
| $(h_1/f_1)/(h_4/f_4) = 3.967$ | | | |
| $f_1 = -1.25$ | $f_2 = 1.90$ | | $f_{23} = 1.28$ |
| $f_4 = -2.86$ | $R_2 = -2.60$ | | $R_2' = 2.60$ |
| $R_3 = 1.80$ | $R_3' = -0.96$ | | | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, and $v_1, v_2, \ldots$ respectively represent Abbe's numbers of respective materials.

8. An objective lens system for an endoscope according to claim 2, said first lens component being a negative single lens, said second lens component comprising two positive single lenses, said third lens component being a cemented lens component comprising a positive lens and a negative lens, and said fourth lens component being a negative meniscus lens, wherein said aperture diaphragm is arranged between said second lens component and said third lens component, and said objective lens system for an endoscope has the following numerical data:

| f = 1.00    F/3.0    image height 0.92 angle of view 101° | | | |
|---|---|---|---|
| $r_1 = 4.4097$ | | | |
| $d_1 = 0.2877$ | | $n_1 = 1.883$ | $v_1 = 40.78$ |
| $r_2 = 0.7457$ | | | |
| $d_2 = 0.4816$ | | | |
| $r_3 = 2.0242$ | | | |
| $d_3 = 0.8705$ | | $n_2 = 1.741$ | $v_2 = 52.68$ |
| $r_4 = \infty$ | | | |
| $d_4 = 0.351$ | | | |
| $r_5 = \infty$ | | | |
| $d_5 = 0.3049$ | | $n_3 = 1.741$ | $v_3 = 52.68$ |
| $r_6 = -2.0242$ | | | |
| $d_6 = 0.0575$ | | | |
| $r_7 = \infty$ (aperture diaphragm) | | | |
| $d_7 = 0.0575$ | | | |
| $r_8 = 1.6116$ | | | |
| $d_8 = 0.5696$ | | $n_4 = 1.51633$ | $v_4 = 64.15$ |
| $r_9 = -1.0213$ | | | |
| $d_9 = 0.2301$ | | $n_5 = 1.80518$ | $v_5 = 25.43$ |
| $r_{10} = -2.1617$ | | | |
| $d_{10} = 0.0575$ | | | |

-continued

| f = 1.00    F/3.0    image height 0.92 angle of view 101° | | | |
|---|---|---|---|
| $r_{11} = \infty$ | | | |
| $d_{11} = 0.2877$ | | $n_6 = 1.53172$ | $v_6 = 48.9$ |
| $r_{12} = \infty$ | | | |
| $d_{12} = 0.3625$ | | | |
| $r_{13} = -0.8009$ | | | |
| $d_{13} = 0.2301$ | | $n_7 = 1.72825$ | $v_7 = 28.46$ |
| $r_{14} = -1.3705$ | | | |
| $d_{14} = 0.3855$ | | | |
| $r_{15} = \infty$ | | | |
| $d_{15} = 0.5754$ | | $n_8 = 1.51633$ | $v_8 = 64.15$ |
| $r_{16} = \infty$ | | | |
| $h_1/f_1 = 0.63$ | $h_4/f_4 = 0.15$ | | |
| $(h_1/f_1)/(h_4/f_4) = 4.344$ | | | |
| $f_1 = -1.06$ | $f_2 = 1.57$ | | $f_{23} = 1.18$ |
| $f_4 = -3.19$ | $R_2 = -2.02$ | | $R_2' = 2.02$ |
| $R_3 = 1.61$ | $R_3' = -1.02$ | | | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, and $v_1, v_2, \ldots$ respectively represent Abbe's numbers of respective materials.

9. An objective lens system for an endoscope according to claim 2, said first lens component being a negative single lens, said second lens component comprising two positive single lenses, said third lens component being a cemented lens component comprising a positive lens and a negative lens, and said fourth lens component being a negative meniscus lens, wherein said aperture diaphragm is arranged between said second lens component and said third lens component, and said objective lens system for an endoscope has the following numerical data:

| f = 1.00    F/3.0    image height 1.063 angle of view 120° | | | |
|---|---|---|---|
| $r_1 = 4.0027$ | | | |
| $d_1 = 0.3336$ | | $n_1 = 1.883$ | $v_1 = 40.78$ |
| $r_2 = 0.8672$ | | | |
| $d_2 = 0.5337$ | | | |
| $r_3 = \infty$ | | | |
| $d_3 = 0.3336$ | | $n_2 = 1.53172$ | $v_2 = 48.90$ |
| $r_4 = \infty$ | | | |
| $d_4 = 0.2763$ | | | |
| $r_5 = 3.3266$ | | | |
| $d_5 = 0.3885$ | | $n_3 = 1.741$ | $v_3 = 52.68$ |
| $r_6 = -5.1676$ | | | |
| $d_6 = 0.2001$ | | | |
| $r_7 = -1.3143$ | | | |
| $d_7 = 0.7465$ | | $n_4 = 1.741$ | $v_4 = 52.68$ |
| $r_8 = -1.3763$ | | | |
| $d_8 = 0.0667$ | | | |
| $r_9 = \infty$ (aperture diaphragm) | | | |
| $d_9 = 0.0667$ | | | |
| $r_{10} = 1.1237$ | | | |
| $d_{10} = 0.9237$ | | $n_5 = 1.51633$ | $v_5 = 64.15$ |
| $r_{11} = -0.8226$ | | | |
| $d_{11} = 0.2668$ | | $n_6 = 1.80518$ | $v_6 = 25.43$ |
| $r_{12} = -1.4219$ | | | |
| $d_{12} = 0.4003$ | | | |
| $r_{13} = -0.8672$ | | | |
| $d_{13} = 0.3336$ | | $n_7 = 1.72825$ | $v_7 = 28.46$ |
| $r_{14} = -1.8779$ | | | |
| $d_{14} = 0.6671$ | | | |
| $r_{15} = \infty$ | | | |
| $d_{15} = 0.3336$ | | $n_8 = 1.51633$ | $v_8 = 64.15$ |
| $r_{16} = \infty$ | | | |
| $h_1/f_1 = 0.76$ | $h_4/f_4 = 0.20$ | | |
| $(h_1/f_1)/(h_4/f_4) = 3.816$ | | | |
| $f_1 = -1.32$ | $f_2 = 2.72$ | | $f_{23} = 1.23$ |
| $f_4 = -2.57$ | $R_2 = -1.38$ | | $R_2' = 3.33$ |

-continued

| f = 1.00 | F/3.0 | image height 1.063 |
| --- | --- | --- |
| | angle of view 120° | |
| $R_3 = 1.12$ | | $R_3' = -0.82$ | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, and $v_1, v_2, \ldots$ respectively represent Abbe's numbers of respective materials.

10. An objective lens system for an endoscope according to claim 2, said first lens component being a negative single lens, said second lens component being a biconvex lens, said third lens component comprising a cemented lens and a positive lens, said cemented lens comprising a positive lens and a negative lens, and said fourth lens component being a negative meniscus lens, wherein said aperture diaphragm is arranged between said second lens component and said third lens component, and said objective lens system for an endoscope has the following numerical data:

| f = 1.00 | F/3.0 | image height 1.08 |
| --- | --- | --- |
| | angle of view 121° | |
| $r_1 = 4.3525$ | | |
| $d_1 = 0.339$ | $n_1 = 1.883$ | $v_1 = 40.78$ |
| $r_2 = 0.7946$ | | |
| $d_2 = 0.8793$ | | |
| $r_3 = \infty$ | | |
| $d_3 = 0.339$ | $n_2 = 1.53172$ | $v_2 = 48.90$ |
| $r_4 = \infty$ | | |
| $d_4 = 0.1627$ | | |
| $r_5 = 2.5566$ | | |
| $d_5 = 0.4746$ | $n_3 = 1.72825$ | $v_3 = 28.46$ |
| $r_6 = -2.5566$ | | |
| $d_6 = 0.1182$ | | |
| $r_7 = \infty$ (aperture diaphragm) | | |
| $d_7 = 0.2585$ | | |
| $r_8 = 4.6183$ | | |
| $d_8 = 0.6813$ | $n_4 = 1.58913$ | $v_4 = 60.97$ |
| $r_9 = -0.8237$ | | |
| $d_9 = 0.2712$ | $n_5 = 1.80518$ | $v_5 = 25.43$ |
| $r_{10} = -1.6936$ | | |
| $d_{10} = 0.1794$ | | |
| $r_{11} = 2.4014$ | | |
| $d_{11} = 0.4746$ | $n_6 = 1.6583$ | $v_6 = 57.33$ |
| $r_{12} = -32.2502$ | | |
| $d_{12} = 0.2936$ | | |
| $r_{13} = -1.2908$ | | |
| $d_{13} = 0.2373$ | $n_7 = 1.80518$ | $v_7 = 25.43$ |
| $r_{14} = -7.7878$ | | |
| $d_{14} = 0.3276$ | | |
| $r_{15} = \infty$ | | |
| $d_{15} = 0.678$ | $n_8 = 1.54869$ | $v_8 = 45.55$ |
| $r_{16} = \infty$ | | |
| $h_1/f_1 = 0.48$ | $h_4/f_4 = 0.32$ | |
| $(h_1/f_1)/(h_4/f_4) = 1.493$ | | |
| $f_1 = -1.15$ | $f_2 = 1.83$ | $f_{23} = 1.29$ |
| $f_4 = -1.95$ | $R_2 = -2.56$ | $R_2' = 2.56$ |
| $R_3 = 4.62$ | $R_3' = -0.82$ | | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, and $v_1, v_2, \ldots$ respectively represent Abbe's numbers of respectively materials.

11. An objective lens system for an endoscope according to claim 2, said first lens component being a negative single lens, said second lens component being a biconvex lens, said third lens component being a cemented lens component comprising a positive lens and a negative lens, and said fourth lens component being a negative meniscus lens, wherein said aperture diaphragm is arranged between said first lens component and said second lens component, and said objective lens system for an endoscope has the following numerical data:

| f = 1.00 | F/3.0 | image height 0.855 |
| --- | --- | --- |
| | angle of view 100° | |
| $r_1 = \infty$ | | |
| $d_1 = 0.2678$ | $n_1 = 1.883$ | $v_1 = 40.78$ |
| $r_2 = 0.9363$ | | |
| $d_2 = 0.3749$ | | |
| $r_3 = \infty$ | | |
| $d_3 = 2.6888$ | $n_2 = 1.8061$ | $v_2 = 40.95$ |
| $r_4 = \infty$ (aperture diaphragm) | | |
| $d_4 = 0.1071$ | | |
| $r_5 = 2.3091$ | | |
| $d_5 = 0.5196$ | $n_3 = 1.64769$ | $v_3 = 33.80$ |
| $r_6 = -2.3091$ | | |
| $d_6 = 0.0536$ | | |
| $r_7 = 2.5522$ | | |
| $d_7 = 0.7231$ | $n_4 = 1.51633$ | $v_4 = 64.15$ |
| $r_8 = -1.0198$ | | |
| $d_8 = 0.2678$ | $n_5 = 1.84666$ | $v_5 = 23.78$ |
| $r_9 = -5.4772$ | | |
| $d_9 = 0.4713$ | | |
| $r_{10} = \infty$ | | |
| $d_{10} = 0.4178$ | $n_6 = 1.51633$ | $v_6 = 64.15$ |
| $r_{11} = -1.5629$ | | |
| $d_{11} = 0.0536$ | | |
| $r_{12} = \infty$ | | |
| $d_{12} = 0.2678$ | $n_7 = 1.53172$ | $v_7 = 48.90$ |
| $r_{13} = \infty$ | | |
| $d_{13} = 0.2892$ | | |
| $r_{14} = -1.0311$ | | |
| $d_{14} = 0.2678$ | $n_8 = 1.883$ | $v_8 = 40.78$ |
| $r_{15} = -1.8843$ | | |
| $d_{15} = 0.5142$ | | |
| $r_{16} = \infty$ | | |
| $d_{16} = 0.5356$ | $n_9 = 1.51633$ | $v_9 = 64.15$ |
| $r_{17} = \infty$ | | |
| $h_1/f_1 = 0.56$ | $h_4/f_4 = 0.18$ | |
| $(h_1/f_1)/(h_4/f_4) = 3.082$ | | |
| $f_1 = -1.06$ | $f_2 = 1.87$ | $f_{23} = 1.63$ |
| $f_4 = -3.02$ | $R_2 = -2.3091$ | $R_2' = 2.3091$ |
| $R_3 = 2.5522$ | $R_3' = -1.0198$ | | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, and $v_1, v_2, \ldots$ respectively represent Abbe's number of respective materials.

12. An objective lens system for an endoscope according to claim 2, said first lens component comprising a negative single lens and a biconvex lens, said negative single lens having a image side surface thereof formed as an aspherical one, said second lens component being a biconvex lens, said third lens component comprising a cemented lens and a positive single lens, said cemented lens component comprising a positive lens and a negative lens, and said fourth lens component being a negative meniscus single lens having a image side surface thereof formed as an aspherical one, wherein said aperture diaphragm is arranged between said second lens component and said third lens component, and said objective lens system for an endoscope has the following numerical data:

| f = 1.00 | F/3.0 | image height 1.147 |
| --- | --- | --- |
| | angle of view 100° | |
| $r_1 = 6.0105$ | | |

-continued

| $f = 1.00$ | $F/3.0$ | image height 1.147 angle of view 100° | |
|---|---|---|---|
| $d_1 = 0.3592$ | | $n_1 = 1.883$ | $\nu_1 = 40.78$ |
| $r_2 = 0.8194$ (aspherical) | | | |
| $d_2 = 0.7184$ | | | |
| $r_3 = 9.2577$ | | | |
| $d_3 = 0.3592$ | | $n_2 = 1.53172$ | $\nu_2 = 48.90$ |
| $r_4 = -30.2947$ | | | |
| $d_4 = 0.3879$ | | | |
| $r_5 = 2.6624$ | | | |
| $d_5 = 0.5029$ | | $n_3 = 1.72825$ | $\nu_3 = 28.46$ |
| $r_6 = -3.7679$ | | | |
| $d_6 = 0.1252$ | | | |
| $r_7 = \infty$ (aperture diaphragm) | | | |
| $d_7 = 0.274$ | | | |
| $r_8 = 4.8937$ | | | |
| $d_8 = 0.6552$ | | $n_4 = 1.58913$ | $\nu_4 = 60.97$ |
| $r_9 = -0.8923$ | | | |
| $d_9 = 0.2874$ | | $n_5 = 1.80518$ | $\nu_5 = 25.43$ |
| $r_{10} = -1.5847$ | | | |
| $d_{10} = 0.1901$ | | | |
| $r_{11} = 2.5445$ | | | |
| $d_{11} = 0.5029$ | | $n_6 = 1.6583$ | $\nu_6 = 57.33$ |
| $r_{12} = -34.1731$ | | | |
| $d_{12} = 0.30$ | | | |
| $r_{13} = -1.3263$ | | | |
| $d_{13} = 0.2514$ | | $n_7 = 1.80518$ | $\nu_7 = 25.43$ |
| $r_{14} = -7.5450$ (aspherical) | | | |
| $d_{14} = 0.3471$ | | | |
| $r_{15} = \infty$ | | | |
| $d_{15} = 0.7184$ | | $n_8 = 1.54869$ | $\nu_8 = 45.55$ |
| $r_{16} = \infty$ | | | |
| $h_1/f_1 = 0.43$ | | $h_4/f_4 = 0.29$ | |
| $(h_1/f_1)/(h_4/f_4) = 1.517$ | | | |
| $E_2 = 0.51666 \times 10^{-1}$ | | $F_2 = 0.1371$ | |
| $E_{14} = 0.17323$ | | $F_{14} = 0$ | |
| $f_1 = -1.29$ | $f_2 = 2.22$ | $f_{23} = 1.37$ | |
| $f_4 = -2.04$ | $R_2 = -3.768$ | $R_2' = 2.66$ | |
| $R_3 = 4.89$ | $R_3' = -0.89$ | | | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, $\nu_1, \nu_2, \ldots$ respectively represent Abbe's numbers of respective materials, $E_2, F_2$ represent the coefficients of said aspherical surface in said first lens component, and $E_{14}, F_{14}$ represent the coefficients of said aspherical surface in said fourth lens component.

13. An objective lens system for an endoscope according to claim 1, said first lens component comprising a negative single lens and a biconvex lens, said second lens component being a biconvex lens, said third lens component being a cemented lens component comprising a positive lens and a negative lens, and said fourth lens component comprising a negative meniscus lens and a biconvex lens, wherein said aperture diaphragm is arranged between said second lens component and said third lens component, and said objective lens system for an endoscope has the following numerical data:

| $f = 1.00$ | $F/3.1$ | image height 1.14 angle of view 138° | |
|---|---|---|---|
| $r_1 = 5.7266$ | | | |
| $d_1 = 0.3573$ | | $n_1 = 1.883$ | $\nu_1 = 40.78$ |
| $r_2 = 0.8615$ | | | |
| $d_2 = 1.6801$ | | | |
| $r_3 = 1.7123$ | | | |
| $d_3 = 0.8102$ | | $n_2 = 1.713$ | $\nu_2 = 53.84$ |
| $r_4 = -3.5156$ | | | |
| $d_4 = 0.0039$ | | | |
| $r_5 = \infty$ (aperture diaphragm) | | | |
| $d_5 = 0.0659$ | | | |
| $r_6 = 2.4711$ | | | |
| $d_6 = 0.6563$ | | $n_3 = 1.51633$ | $\nu_3 = 64.15$ |
| $r_7 = -0.7133$ | | | |
| $d_7 = 0.2863$ | | $n_4 = 1.80518$ | $\nu_4 = 25.43$ |
| $r_8 = -1.2246$ | | | |
| $d_8 = 0.0636$ | | | |
| $r_9 = \infty$ | | | |
| $d_9 = 0.1034$ | | $n_5 = 1.53172$ | $\nu_5 = 48.90$ |
| $r_{10} = \infty$ | | | |
| $d_{10} = 0.1720$ | | | |
| $r_{11} = -0.9620$ | | | |
| $d_{11} = 0.2147$ | | $n_6 = 1.72825$ | $\nu_6 = 28.46$ |
| $r_{12} = -2.5078$ | | | |
| $d_{12} = 0.0517$ | | | |
| $r_{13} = 7.1019$ | | | |
| $d_{13} = 0.5011$ | | $n_7 = 1.51633$ | $\nu_7 = 64.15$ |
| $r_{14} = -19.3899$ | | | |
| $d_{14} = 0.7158$ | | | |
| $r_{15} = \infty$ | | | |
| $d_{15} = 0.3579$ | | $n_8 = 1.51633$ | $\nu_8 = 64.15$ |
| $r_{16} = \infty$ | | | |
| $h_1/f_1 = 0.813$ | | $h_4/f_4 = 0.177$ | |
| $(h_1/f_1)/(h_4/f_4) = 4.59$ | | | |
| $f_1 = -1.189$ | $f_2 = 1.726$ | $f_{23} = 1.262$ | |
| $f_4 = -3.075$ | $R_2 = -3.5156$ | $R_2' = 1.7123$ | |
| $R_3 = 2.4711$ | $R_3' = -0.7133$ | | | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, and $\nu_1, \nu_2, \ldots$ respectively represent Abbe's numbers of respective materials.

14. An objective lens system for an endoscope according to claim 2, said first lens component being a negative single lens, said second lens component being a biconvex lens, said third lens component being a cemented lens component comprising a positive lens and a negative lens, and said fourth lens component comprising a negative meniscus lens and a positive meniscus lens, wherein said aperture diaphragm is arranged between said second lens component and said third lens component, and said objective lens system for an endoscope has the following numerical data:

| $f = 1.00$ | $F/3.1$ | image height 1.2 angle of view 140° | |
|---|---|---|---|
| $r_1 = 3.1833$ | | | |
| $d_1 = 0.3782$ | | $n_1 = 1.883$ | $\nu_1 = 40.78$ |
| $r_2 = 0.8334$ | | | |
| $d_2 = 1.7146$ | | | |
| $r_3 = 2.43$ | | | |
| $d_3 = 0.7182$ | | $n_2 = 1.713$ | $\nu_2 = 53.84$ |
| $r_4 = -2.2325$ | | | |
| $d_4 = 0.025$ | | | |
| $r_5 = \infty$ (aperture diaphragm) | | | |
| $d_5 = 0.0546$ | | | |
| $r_6 = 7.1362$ | | | |
| $d_6 = 0.5463$ | | $n_3 = 1.51633$ | $\nu_3 = 64.15$ |
| $r_7 = -0.7591$ | | | |
| $d_7 = 0.2185$ | | $n_4 = 1.80518$ | $\nu_4 = 25.43$ |
| $r_8 = -1.293$ | | | |
| $d_8 = 0.0672$ | | | |
| $r_9 = \infty$ | | | |
| $d_9 = 0.1092$ | | $n_5 = 1.53172$ | $\nu_5 = 48.90$ |
| $r_{10} = \infty$ | | | |
| $d_{10} = 0.302$ | | | |
| $r_{11} = -0.888$ | | | |
| $d_{11} = 0.2731$ | | $n_6 = 1.72825$ | $\nu_6 = 28.46$ |
| $r_{12} = -1.1927$ | | | |
| $d_{12} = 0.0546$ | | | |
| $r_{13} = 10.5247$ | | | |
| $d_{13} = 0.5295$ | | $n_7 = 1.51633$ | $\nu_7 = 64.15$ |

-continued

| f = 1.00 F/3.1 image height 1.2 angle of view 140° | | | |
|---|---|---|---|
| $r_{14} = 117.0536$ | | | |
| $d_{14} = 0.7564$ | | | |
| $r_{15} = \infty$ | | | |
| $d_{15} = 0.3782$ | | $n_8 = 1.51633$ | $v_8 = 64.15$ |
| $r_{16} = \infty$ | | | |
| $h_1/f_1 = 0.801$ | | $h_4/f_4 = 0.0488$ | |
| $(h_1/f_1)/(h_4/f_4) = 16.41$ | | | |
| $f_1 = -1.383$ | $f_2 = 1.744$ | $f_{23} = 1.335$ | |
| $f_4 = -12.545$ | $R_2 = -2.2325$ | $R_2' = 2.43$ | |
| $R_3 = 7.1362$ | $R_3' = -0.7591$ | | | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, and $v_1, v_2, \ldots$ respectively represent Abbe's numbers of respective materials.

15. An objective lens system for an endoscope according to claim 2, said first lens component being an aspherical lens component.

16. An objective lens system for an endoscope according to claim 15, said first lens component being a negative single lens having an object side surface thereof formed as an aspherical one, said second lens component being a biconvex lens, said third lens component being a cemented lens component comprising a positive lens and a negative lens, and said fourth lens component being a negative meniscus lens, wherein said aperture diaphragm is arranged between said second lens component and said third lens component, and said objective lens system for an endoscope has the following numerical data:

| f = 1.00 F/3.438 image height 1.1036 angle of view 101° | | | |
|---|---|---|---|
| $r_1 = \infty$ (aspherical) | | | |
| $d_1 = 0.2770$ | | $n_1 = 1.51633$ | $v_1 = 64.15$ |
| $r_2 = 0.7047$ | | | |
| $d_2 = 1.3918$ | | | |
| $r_3 = 1.8404$ | | | |
| $d_3 = 0.2770$ | | $n_2 = 1.74100$ | $v_2 = 52.68$ |
| $r_4 = -6.2624$ | | | |
| $d_4 = 0.0554$ | | | |
| $r_5 = \infty$ (aperture diaphragm) | | | |
| $d_5 = 0.0554$ | | | |
| $r_6 = 3.4891$ | | | |
| $d_6 = 0.6094$ | | $n_3 = 1.62041$ | $v_3 = 60.27$ |
| $r_7 = -0.5540$ | | | |
| $d_7 = 0.2216$ | | $n_4 = 1.80518$ | $v_4 = 25.43$ |
| $r_8 = -1.1104$ | | | |
| $d_8 = 0.9041$ | | | |
| $r_9 = -0.6186$ | | | |
| $d_9 = 0.2770$ | | $n_5 = 1.72825$ | $v_5 = 28.46$ |
| $r_{10} = -1.0830$ | | | |
| $h_1/f_1 = 0.565$ | | $h_4/f_4 = 0.221$ | |
| $(h_1/f_1)/(h_4/f_4) = 2.557$ | | | |
| $E_1 = 0.46954 \times 10^{-1}$ | | | |
| $f_1 = -1.57$ | $f_2 = 1.948$ | $f_{23} = 1.14$ | |
| $f_4 = -2.65$ | $R_2 = -6.2624$ | $R_2' = 1.8404$ | |
| $R_3 = 3.4891$ | $R_3' = -0.554$ | | | where $r_1, r_2, \ldots$ respectively represent the radii of curvature of respective surfaces, $d_1, d_2, \ldots$ respectively represent the spaces between the respective surfaces, $n_1, n_2, \ldots$ respectively represent the refractive indices of respective materials, $v_1, v_2, \ldots$ respectively represent Abbe's numbers of respective materials, and $E_1$ represents the coefficient of said aspherical surface.

17. An objective lens system for an endoscope according to claim 15, said first lens component being a negative single lens having an object side surface thereof formed as an aspherical one, said second lens component being a cemented lens component consisting of a positive lens and a negative lens, said third lens component being a cemented lens component comprising a positive lens and a negative lens, and said fourth lens component being a negative meniscus lens, wherein said aperture diaphragm is arranged between said second lens component and said third lens component, and said objective lens system for an endoscope has the following numerical data:

| f = 1.00 F / 3.365 image height 1.0969 angle of view 98° | | | |
|---|---|---|---|
| $r_1 = \infty$ (aspherical) | | | |
| $d_1 = 0.2753$ | | $n_1 = 1.51633$ | $v_1 = 64.15$ |
| $r_2 = 0.7513$ | | | |
| $d_2 = 1.4662$ | | | |
| $r_3 = 2.3609$ | | | |
| $d_3 = 0.5507$ | | $n_2 = 1.59270$ | $v_2 = 35.29$ |
| $r_4 = -1.0953$ | | | |
| $d_4 = 0.2203$ | | $n_3 = 1.83400$ | $v_3 = 37.16$ |
| $r_5 = -2.7689$ | | | |
| $d_5 = 0.0551$ | | | |
| $r_6 = \infty$ (aperture diaphragm) | | | |
| $d_6 = 0.0551$ | | | |
| $r_7 = 2.3940$ | | | |
| $d_7 = 0.6057$ | | $n_4 = 1.62041$ | $v_4 = 60.27$ |
| $r_8 = -0.5884$ | | | |
| $d_8 = 0.2203$ | | $n_5 = 1.80518$ | $v_5 = 25.43$ |
| $r_9 = -1.1177$ | | | |
| $d_9 = 0.8941$ | | | |
| $r_{10} = -0.6526$ | | | |
| $d_{10} = 0.2753$ | | $n_6 = 1.84666$ | $v_6 = 23.88$ |
| $r_{11} = -0.9566$ | | | |
| $h_1/f_1 = 0.637$ | | $h_4/f_4 = 0.135$ | |
| $(h_1/f_1)/(h_4/f_4) = 4.72$ | | | |
| $E_1 = 0.58567 \times 10^{-1}$ | | | |
| $f_1 = -1.46$ | $f_2 = 3.095$ | $f_{23} = 1.27$ | |
| $f_4 = -4.15$ | $R_2 = -2.7689$ | $r_2' = 2.3609$ | |
| $R_3 = 2.394$ | $R_3' = -0.5884$ | | | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, $v_1, v_2, \ldots$ respectively represent Abbe's numbers of respective materials, and $E_1$ represents the coefficient of said aspherical surface.

18. An objective lens system for an endoscope according to claim 15, said first lens component being a negative single lens having an object side surface thereof formed as an aspherical one, said second lens component being a cemented lens component consisting of a positive lens and a negative lens, said third lens component being a cemented lens component comprising a negative lens and a positive lens, and said fourth lens component being a negative meniscus lens, wherein said aperture diaphragm is arranged between said second lens component and said third lens component, and said objective lens system for an endoscope has the following numerical data:

| f = 1.00 F/3.295 image height 1.1141 angle of view 99° | | | |
|---|---|---|---|
| $r_1 = \infty$ (aspherical) | | | |
| $d_1 = 0.2796$ | | $n_1 = 1.51633$ | $v_1 = 64.15$ |
| $r_2 = 0.7952$ | | | |
| $d_2 = 1.4787$ | | | |
| $r_3 = 5.3878$ | | | |
| $d_3 = 0.5593$ | | $n_2 = 1.59270$ | $v_2 = 35.29$ |
| $r_4 = -0.7414$ | | | |

-continued

| f = 1.00 | F/3.295 | image height 1.1141 |
| | angle of view 99° | |

| | | |
|---|---|---|
| $d_4 = 0.2237$ | $n_3 = 1.83400$ | $v_3 = 37.16$ |
| $r_5 = -1.9280$ | | |
| $d_5 = 0.0559$ | | |
| $r_6 = \infty$ (aperture diaphragm) | | |
| $d_6 = 0.0559$ | | |
| $r_7 = 1.5169$ | | |
| $d_7 = 0.2237$ | $n_4 = 1.80518$ | $v_4 = 25.43$ |
| $r_8 = 0.6123$ | | |
| $d_8 = 0.6152$ | $n_5 = 1.56883$ | $v_5 = 56.34$ |
| $r_9 = -1.0448$ | | |
| $d_9 = 0.8849$ | | |
| $r_{10} = -0.7375$ | | |
| $d_{10} = 0.2796$ | $n_6 = 1.84666$ | $v_6 = 23.88$ |
| $r_{11} = -1.0612$ | | |
| $h_1/f_1 = 0.631$ | $h_4/f_4 = 0.12$ | |
| $(h_1/f_1)/(h_4/f_4) = 5.26$ | | |
| $E_1 = 0.54347 \times 10^{-1}$ | | |
| $f_1 = -1.54$ | $f_2 = 4.471$ | $f_{23} = 1.27$ |
| $f_4 = -4.73$ | $R_2 = -1.928$ | $R_2' = 5.3878$ |
| $R_3 = 1.5169$ | $R_3' = 0.6123$ | | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, $v_1, v_2, \ldots$ respectively represent Abbe's numbers of respective materials, and $E_1$ represents the coefficient of said aspherical surface.

19. An objective lens system for an endoscope comprising, in the order from the object side, a first lens component having a negative refracting power, a second lens component having a positive refracting power, a third lens component having a positive refracting power, a fourth lens component involving a meniscus lens having its concave surface facing the object side, and an aperture diaphragm arranged between the outermost surface of the second lens component toward the object and the outermost surface of the third lens component toward the image, said first lens component being an aspherical lens component having at least one aspherical surface the shape of which is that the object side surface of the lens component involves such a portion that the curvature of object side surface becomes progressively stronger toward the edge of the surface and the image side surface of the lens component involves such a portion that the curvature of image side surface becomes progressively weaker toward the edge of the surface, and said object lens system for an endoscope satisfying the following condition (1):

$$|h_1/f_1| > 1.15|h_4/f_4| \tag{1}$$

where, $h_1$ and $h_4$ represent the mean values of the heights of the principal ray at respective surfaces of said first lens component and said fourth lens component, $f_1$ and $f_4$ represent the focal lengths of the first lens component and the fourth lens component, respectively.

20. An objective lens system for an endoscope according to claim 19, further satisfying the following conditions (2), (3), and (4):

$$f_2 < 3.5 f \tag{2}$$

$$|f_4| < 6 \text{ tm} \tag{3}$$

$$-R_2 \leq 15 f \tag{4}$$

where $f_2$ represents the focal length of the second lens component, f represents the focal length of the objective lens system, $R_2$ represents the radius of curvature of the image side surface of said second lens component.

21. An objective lens system for an endoscope according to claim 20, said third lens component being a cemented lens component, and further satisfying the following conditions (5) through (8):

$$|f_1| < 1.7 f \tag{5}$$

$$|f_{23}| < 1.7 f \tag{6}$$

$$R_2' > 0 \tag{7}$$

$$R_3 < 5 f \tag{8}$$

$$|R_3'| < 3 f \tag{9}$$

where $f_{23}$ represents the composite focal length of said second lens component and said third lens component, $R_2'$ represents the radius of curvature of said outermost surface of said second lens component towards the object, $R_3$ represents the radius of curvature of the outermost surface of the third lens component towards the object, $R_3'$ represents the radius of curvature of the cemented surface of said third lens component.

22. An objective lens system for an endoscope according to claim 21, said first lens component being a negative single lens having an object side surface thereof formed as an aspherical one, said second lens component being a biconvex lens, said third lens component being a cemented lens component comprising a positive lens and a negative lens, and said fourth lens component being a negative meniscus lens, wherein said aperture diaphragm is arranged between said second lens component and said third lens component, and said objective lens system for an endoscope has the following numerical data:

| f = 1.00 | F/3.438 | image height 1.1036 |
| | angle of view 101° | |

| | | |
|---|---|---|
| $r_1 = \infty$ (aspherical) | | |
| $d_1 = 0.2770$ | $n_1 = 1.51633$ | $v_1 = 64.15$ |
| $r_2 = 0.7047$ | | |
| $d_2 = 1.3918$ | | |
| $r_3 = 1.8404$ | | |
| $d_3 = 0.22770$ | $n_2 = 1.74100$ | $v_2 = 52.68$ |
| $r_4 = -6.2624$ | | |
| $d_4 = 0.0554$ | | |
| $r_5 = \infty$ (aperture diaphragm) | | |
| $d_5 = 0.554$ | | |
| $r_6 = 3.4891$ | | |
| $d_6 = 0.6094$ | $n_3 = 1.62041$ | $v_3 = 60.27$ |
| $r_7 = -0.5540$ | | |
| $d_7 = 0.2216$ | $n_4 = 1.80518$ | $v_4 = 25.43$ |
| $r_8 = -1.1104$ | | |
| $d_8 = 0.9041$ | | |
| $r_9 = -0.6186$ | | |
| $d_9 = 0.2770$ | $n_5 = 1.72825$ | $v_5 = 28.46$ |
| $r_{10} = -1.0830$ | | |
| $h_1/f_1 = 0.565$ | $h_4/f_4 = 0.221$ | |
| $(h_1/f_1)/(h_4/f_4) = 2.557$ | | |
| $E_1 = 0.46954 \times 10^{-1}$ | | |
| $f_1 = -1.57$ | $f_2 = 1.948$ | $f_{23} = 1.14$ |
| $f_4 = -2.65$ | $R_2 = -6.2624$ | $R_2' = 1.8404$ |
| $R_3 = 3.4891$ | $R_3' = -0.554$ | | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, $v_1, v_2, \ldots$ respectively represent Abbe's numbers of respective materials, and $E_1$ represents the coefficient of said aspherical surface.

23. An objective lens system for an endoscope according to claim 21, said first lens component being a negative single lens having an object side surface thereof formed as an aspherical one, said second lens component being a cemented lens component consisting of a positive lens and a negative lens, said third lens component being a cemented lens component comprising a positive lens and a negative lens, and said fourth lens component being a negative meniscus lens, wherein said aperture diaphragm is arranged between said second lens component and said third lens component, and said objective lens system for an endoscope has the following numerical data:

| $f = 1.00$ F/3.365 image height 1.0969 angle of view 98° | | |
|---|---|---|
| $r_1 = \infty$ (aspherical) | | |
| $d_1 = 0.2753$ | $n_1 = 1.51633$ | $v_1 = 64.15$ |
| $r_2 = 0.7513$ | | |
| $d_2 = 1.4662$ | | |
| $r_3 = 2.3609$ | | |
| $d_3 = 0.5507$ | $n_2 = 1.59270$ | $v_1 = 35.29$ |
| $r_4 = -1.0953$ | | |
| $d_4 = 0.2203$ | $n_3 = 1.83400$ | $v_3 = 37.16$ |
| $r_5 = -2.7689$ | | |
| $d_5 = 0.0551$ | | |
| $r_6 = \infty$ (aperture diaphragm) | | |
| $d_6 = 0.0551$ | | |
| $r_7 = 2.3940$ | | |
| $d_7 = 0.6057$ | $n_4 = 1.62041$ | $v_4 = 60.27$ |
| $r_8 = -0.5884$ | | |
| $d_8 = 0.2203$ | $n_5 = 1.80518$ | $v_5 = 25.43$ |
| $r_9 = -1.1177$ | | |
| $d_9 = 0.8941$ | | |
| $r_{10} = -0.6526$ | | |
| $d_{10} = 0.2753$ | $n_6 = 1.84666$ | $v_6 = 23.88$ |
| $r_{11} = -0.9566$ | | |
| $h_1/f_1 = 0.637$ | $h_4/f_4 = 0.135$ | |
| $(h_1/f_1)/(h_4/f_4) = 4.72$ | | |
| $E_1 = 0.58567 \times 10^{-1}$ | | |
| $f_1 = -1.46$ | $f_2 = 3.095$ | $f_{23} = 1.27$ |
| $f_4 = -4.15$ | $R_2 32 -2.7689$ | $R_2' = 2.3609$ |
| $R_3 = 2.394$ | $R_3' = -0.5884$ | | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, $v_1, v_2, \ldots$ respectively represent Abbe's numbers of respective materials, and $E_1$ represents the coefficient of said aspherical surface.

24. An objective lens system for an endoscope according to claim 21, said first lens component being a negative single lens having an object side surface thereof formed as an aspherical one, said second lens component being a cemented lens component consisting of a positive lens and a negative lens, said third lens component being a cemented lens component comprising a negative lense and a positive lens, and said fourth lens component being a negative meniscus lens, wherein said aperture diaphragm is arranged between said second lens component and said third lens component, and said objective lens system for an endoscope has the following numerical data:

| $f = 1.00$ F/3.295 image height 1.1141 angle of view 99° | | |
|---|---|---|
| $r_1 = \infty$ (aspherical) | | |
| $d_1 = 0.2796$ | $n_1 = 1.51633$ | $v_1 = 64.15$ |

-continued

| $f = 1.00$ F/3.295 image height 1.1141 angle of view 99° | | |
|---|---|---|
| $r_2 = 0.7952$ | | |
| $d_2 = 1.4787$ | | |
| $r_3 = 5.3878$ | | |
| $d_3 = 0.5593$ | $n_2 = 1.59270$ | $v_2 = 35.29$ |
| $r_4 = -0.7414$ | | |
| $d_4 = 0.2237$ | $n_3 = 1.83400$ | $v_3 = 37.16$ |
| $r_5 = -1.9280$ | | |
| $d_5 = 0.0559$ | | |
| $r_6 = \infty$ (aperture diaphragm) | | |
| $d_6 = 0.0559$ | | |
| $r_7 = 1.5169$ | | |
| $d_7 = 0.2237$ | $n_4 = 1.80518$ | $v_4 = 25.43$ |
| $r_8 = 0.6123$ | | |
| $d_8 = 0.6152$ | $n_5 = 1.56883$ | $v_5 = 56.34$ |
| $r_9 = -1.0448$ | | |
| $d_9 = 0.8849$ | | |
| $r_{10} = -0.7375$ | | |
| $d_{10} = 0.2796$ | $n_6 = 1.84666$ | $v_6 = 23.88$ |
| $r_{11} = -1.0612$ | | |
| $h_1/f_1 = 0.631$ | $h_4/f_4 = 0.12$ | |
| $(h_1/f_1)/(h_4/f_4) = 5.26$ | | |
| $E_1 = 0.54347 \times 10^{-1}$ | | |
| $f_1 = -1.54$ | $f_2 = 4.471$ | $f_{23} = 1.27$ |
| $f_4 = -4.73$ | $R_2 = -1.928$ | $R_2' = 5.3878$ |
| $R_3 = 1.5169$ | $R_3' = 0.6123$ | | where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, $v_1, v_2, \ldots$ respectively represent Abbe's numbers of respective materials, and $E_1$ represents the coefficient of said aspherical surface.

25. An objective lens system for an endoscope according to claim 19, said fourth lens component being an aspherical lens component having at least one aspherical surface the shape of which is that the object side surface of the lens component involves such a portion that the absolute value of the curvature of object side surface becomes progressively larger toward the edge of the surface and the image side surface of the lens component involves such a portion that the absolute value of the curvature of image side surface becomes progressively smaller toward the edge of the surface.

26. An objective lens system for an endoscope according to claim 25, further satisfying the following conditions (2), (3), and (4):

$$f_2 < 3.5 f \quad (2)$$

$$|f_4| < 6 f \quad (3)$$

$$-R_2 \leqq 15 f \quad (4)$$

where $f_2$ represents the focal length of the second lens component, f represents the focal length of the objective lens system, $R_2$ represents the radius of curvature of the image side surface of said second lens component.

27. An objective lens system for an endoscope according to claim 26, said third lens component being a cemented lens component, and further satisfying the following conditions (5) through (8):

$$|f_1| < 1.7 f \quad (5)$$

$$|f_{23}| < 1.7 f \quad (6)$$

$$R_2' > 0 \quad (7)$$

$$R_3 < 5 f \quad (8)$$

$|R_3'| < 3f$          (9)

where $f_{23}$ represents the composite focal length of said second lens component and said third lens component, $R_2'$ represents the radius of curvature of said outermost surface of said second lens component towards the object, $R_3$ represents the radius of curvature of the outermost surface of the third lens component towards the object, $R_3'$ represents the radius of curvature of the cemented surface of said third lens component.

28. An objective lens system for an endoscope according to claim 27, said first lens component comprising a negative single lens and a biconvex lens, said negative single lens having a image side surface thereof formed as an aspherical one, said second lens component being a biconvex lens, said third lens component comprising a cemented lens and a positive single lens, said cemented lens component comprising a positive lens and a negative lens, and said fourth lens component being a negative meniscus single lens having a image side surface thereof formed as an aspherical one, wherein said aperture diaphragm is arranged between said second lens component and said third lens component, and said objective lens system for an endoscope has the following numerical data:

$f = 1.00$    $F/3.0$    image height 1.147
angle of view 100°

$r_1 = 6.0105$
$d_1 = 0.3592$    $n_1 = 1.883$    $v_1 = 40.78$
$r_2 = 0.8194$ (aspherical)
$d_2 = 0.7184$
$r_3 = 9.2577$
$d_3 = 0.3592$    $n_2 = 1.53172$    $v_2 = 48.90$
$r_4 = -30.2947$
$d_4 = 0.3879$ -continued $f = 1.00$    $F/3.0$    image height 1.147
angle of view 100°

$r_5 = 2.6624$
$d_5 = 0.5029$    $n_3 = 1.72825$    $v_3 = 28.46$
$r_6 = -3.7679$
$d_6 = 0.1252$
$r_7 = \infty$ (aperture diaphragm)
$d_7 = 0.274$
$r_8 = 4.8937$
$d_8 = 0.6552$    $n_4 = 1.58913$    $v_4 = 60.97$
$r_9 = -0.8923$
$d_9 = 0.2874$    $n_5 = 1.80518$    $v_5 = 25.43$
$r_{10} = -1.5847$
$d_{10} = 0.1901$
$r_{11} = 2.5445$
$d_{11} = 0.5029$    $n_6 = 1.6583$    $v_6 = 57.33$
$r_{12} = -34.1731$
$d_{12} = 0.30$
$r_{13} = -1.3263$
$d_{13} = 0.2514$    $n_7 = 1.80518$    $v_7 = 25.43$
$r_{14} = -7.5450$ (aspherical)
$d_{14} = 0.3471$
$r_{15} = \infty$
$d_{15} = 0.7184$    $n_8 = 1.54869$    $v_8 = 45.55$
$r_{16} = \infty$
$h_1/f_1 = 0.43$          $h_4/f_4 = 0.29$
$(h_1/f_1)/(h_4/f_4) = 1.517$
$E_2 = 0.51666 \times 10^{-1}$    $F_2 = 0.1371$
$E_{14} = 0.17323$          $F_{14} = 0$
$f_1 = -1.29$    $f_2 = 2.22$    $f_{23} = 1.37$
$f_4 = -2.04$    $R_2 = -3.768$    $R_2' = 2.66$
$R_3 = 4.89$    $R_3' = -0.89$ where $r_1, r_2, \ldots$ respectively represent the radii of curvature of respective surfaces, $d_1, d_2, \ldots$ respectively represent the spaces between respective surfaces, $n_1, n_2, \ldots$ respectively represent the refractive indices of respective materials, $v_1, v_2, \ldots$ respectively represent Abbe's numbers of respective materials, $E_2$, $F_2$ represent the coefficients of said aspherical surface in said first lens component, and $E_{14}$, $F_{14}$ represent the coefficients of said aspherical surface in said fourth lens component.

* * * * *